US012526413B2

(12) United States Patent
Wang et al.

(10) Patent No.: US 12,526,413 B2
(45) Date of Patent: Jan. 13, 2026

(54) VIDEO DECODING METHOD AND APPARATUS, VIDEO CODING METHOD AND APPARATUS, STORAGE MEDIUM, AND ELECTRONIC DEVICE

(71) Applicant: Tencent Technology (Shenzhen) Company Limited, Guangdong (CN)

(72) Inventors: Liqiang Wang, Shenzhen (CN); Xiaozhong Xu, Shenzhen (CN); Shan Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 244 days.

(21) Appl. No.: 17/890,691

(22) Filed: Aug. 18, 2022

(65) Prior Publication Data
US 2022/0394265 A1    Dec. 8, 2022

Related U.S. Application Data

(63) Continuation of application No. PCT/CN2021/112359, filed on Aug. 12, 2021.

(30) Foreign Application Priority Data

Aug. 21, 2020  (CN) .......................... 202010855625.1

(51) Int. Cl.
*H04N 19/129* (2014.01)
*H04N 19/105* (2014.01)
(Continued)

(52) U.S. Cl.
CPC ......... *H04N 19/124* (2014.11); *H04N 19/105* (2014.11); *H04N 19/12* (2014.11);
(Continued)

(58) Field of Classification Search
CPC ...... H04N 19/129; H04N 19/12; H04N 19/13; H04N 19/60; H04N 19/70
(Continued)

(56) References Cited

U.S. PATENT DOCUMENTS

| 2013/0343448 A1 | 12/2013 | He et al. |
| 2019/0104322 A1* | 4/2019 | Tsukuba ............... H04N 19/176 |
| 2023/0017146 A1* | 1/2023 | Zhang .................. H04N 19/105 |

FOREIGN PATENT DOCUMENTS

| CN | 110800296 A | 2/2020 |
| CN | 112533000 A | 3/2021 |

(Continued)

OTHER PUBLICATIONS

Heiko Schwarz, "BoG report on CE7-related and Non-CE7 contributions" CE Coordinators, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-20.
(Continued)

*Primary Examiner* — Jeffery A Williams
(74) *Attorney, Agent, or Firm* — Sughrue Mion, PLLC

(57) ABSTRACT

A video decoding method and apparatus, a video coding method and apparatus, a storage medium, and an electronic device. The video decoding method includes: performing entropy decoding on a coding block of a video image frame to obtain a quantization coefficient block of residual data corresponding to the coding block; calculating quantization coefficients in a specified region in the quantization coefficient block to obtain a quantization coefficient statistics value; and determining, according to the quantization coefficient statistics value, whether to skip an inverse transform process.

20 Claims, 7 Drawing Sheets

(51) Int. Cl.
    *H04N 19/12*     (2014.01)
    *H04N 19/124*     (2014.01)
    *H04N 19/13*     (2014.01)
    *H04N 19/167*     (2014.01)
    *H04N 19/176*     (2014.01)
    *H04N 19/30*     (2014.01)
    *H04N 19/60*     (2014.01)
    *H04N 19/70*     (2014.01)
(52) U.S. Cl.
    CPC ........... *H04N 19/13* (2014.11); *H04N 19/167* (2014.11); *H04N 19/176* (2014.11); *H04N 19/60* (2014.11); *H04N 19/70* (2014.11)
(58) Field of Classification Search
    USPC ..................................................... 375/240.03
    See application file for complete search history.

(56) References Cited

FOREIGN PATENT DOCUMENTS

| | | |
|---|---|---|
| EP | 3 484 151 A1 | 5/2019 |
| JP | 2023-529183 A | 7/2023 |
| WO | 2021/244586 A1 | 12/2021 |

OTHER PUBLICATIONS

International Search Report for PCT/CN2021/112359 dated Nov. 1, 2021 [PCT/ISA/210].
Chinese Office Action for 202010855625.1 dated Jul. 29, 2022.
Extended European Search Report issued Sep. 26, 2023 in European Application No. 21857573.6.
Dahee Lee, et al., "Fast Transform Skip Mode Decision for HEVC Screen Content Coding", 2015 IEEE International Symposium on Broadband Multimedia Systems and Broadcasting, IEEE, Jun. 17, 2015 (4 pages total).
Office Action issued Oct. 31, 2023 in Japanese Application No. 2022-556027.
Atsumichi Murakami, et al., "High Efficiency Video Coding", HEVC/H.265, Ohmsha, Feb. 25, 2013, 1st Edition (12 pages total).
Written Opinion issued Nov. 1, 2021 in International Application No. PCT/CN2021/112359.
Communication dated Apr. 3, 2025 in Korean Application No. 10-2022-7031426.
Bross, et al., "Versatile Video Coding (Draft 6)", Joint Video Experts Team (JVET) of ITU-T SG 16 WP 3 and ISO/IEC JTC 1/SC 29/WG 11 15th Meeting , Jul. 3-12, 2019, 455 pages JVET-O2001-vE.

* cited by examiner

VIDEO DECODING METHOD AND APPARATUS, VIDEO CODING METHOD AND APPARATUS, STORAGE MEDIUM, AND ELECTRONIC DEVICE

CROSS-REFERENCE TO RELATED APPLICATION(S)

This application is a continuation application of International Application No. PCT/CN2021/112359 filed on Aug. 12, 2021, which claims priority to Chinese Patent Application No. 202010855625.1 filed with the China National Intellectual Property Administration on Aug. 21, 2020, the disclosures of which are incorporated by reference in their entireties.

FIELD

The present disclosure relates to the field of computer and communications technologies, and in particular, to a video decoding method and apparatus, a video coding method and apparatus, a storage medium, and an electronic device.

BACKGROUND

During video coding, a coder end usually needs to perform transform, quantization, and entropy coding on residual data between original video data and predicted video data before sending the residual data to a decoder end. Due to diversified residual data, a single discrete cosine transform (DCT) transform kernel cannot adapt to all residual characteristics. Therefore, a plurality of DCT transform kernels are required to form a transform matrix combination for a residual block. For some residual blocks having a weak correlation, coding efficiency can even be improved if the quantization process is directly performed while skipping the transform process. However, this manner requires to code a transform skip flag for each coding unit (CU for short) to indicate whether a transform process is skipped. Additionally, coding transform skip flags affects video coding efficiency.

SUMMARY

Embodiments of the disclosure provide a video decoding method and apparatus, a video coding method and apparatus, a storage medium, and an electronic device, which effectively improves video coding efficiency at least to a certain extent.

Other features and advantages become obvious through the following detailed descriptions, or may be partially learned through the practice of the embodiments.

According to an aspect of the embodiments, a video decoding method may be provided, including: performing entropy decoding on a coding block of a video image frame to obtain a quantization coefficient block of residual data corresponding to the coding block; calculating quantization coefficients in a specified region in the quantization coefficient block to obtain a quantization coefficient statistics value; and determining, according to the quantization coefficient statistics value, whether to skip an inverse transform process.

According to an aspect of the embodiments, a video coding method may be provided, including: skipping transform and directly performing quantization on residual data required for acquiring a coding block of a video image frame, to obtain a first quantization coefficient block of the residual data; successively performing transform and quantization on the residual data to obtain a second quantization coefficient block of the residual data; acquiring a third quantization coefficient block based on the first quantization coefficient block, a quantization coefficient statistics value corresponding to the third quantization coefficient block being used for instructing to skip an inverse transform process, and being obtained by calculating quantization coefficients in a specified region in the third quantization coefficient block; acquiring a fourth quantization coefficient block based on the second quantization coefficient block, a quantization coefficient statistics value corresponding to the fourth quantization coefficient block being used for instructing to perform an inverse transform process, and being obtained by calculating quantization coefficients in a specified region in the fourth quantization coefficient block; and performing entropy coding on one of the third quantization coefficient block and the fourth quantization coefficient block that satisfies a selection condition, to obtain the coding block of the video image frame.

According to an aspect of the embodiments, a video decoding apparatus may be provided, including: a decoding unit, configured to perform entropy decoding on a coding block of a video image frame to obtain a quantization coefficient block of residual data corresponding to the coding block; a calculation unit, configured to calculate quantization coefficients in a specified region in the quantization coefficient block to obtain a quantization coefficient statistics value; and a decision unit, configured to determine, according to the quantization coefficient statistics value, whether to skip an inverse transform process.

According to an aspect of the embodiments, a video coding apparatus may be provided, including: a processing unit, configured to: skip transform and directly perform quantization on residual data required for acquiring a coding block of a video image frame, to obtain a first quantization coefficient block of the residual data; and successively perform transform and quantization on the residual data to obtain a second quantization coefficient block of the residual data; an acquisition unit, configured to: acquire a third quantization coefficient block based on the first quantization coefficient block, a quantization coefficient statistics value corresponding to the third quantization coefficient block being used for instructing to skip an inverse transform process, and being obtained by calculating quantization coefficients in a specified region in the third quantization coefficient block; and acquire a fourth quantization coefficient block based on the second quantization coefficient block, a quantization coefficient statistics value corresponding to the fourth quantization coefficient block being used for instructing to perform an inverse transform process, and being obtained by calculating quantization coefficients in a specified region in the fourth quantization coefficient block; and the processing unit being further configured to perform entropy coding on one of the third quantization coefficient block and the fourth quantization coefficient block that satisfies a selection condition, to obtain the coding block of the video image frame.

According to an aspect of the embodiments, a video processing system may be provided, including a video coding apparatus and a video decoding apparatus, the video coding apparatus being configured to perform the video coding method described in the above embodiment, and the video decoding apparatus being configured to perform the video decoding method described in the above embodiment.

According to an aspect of the embodiments, a non-transitory computer-readable medium may be provided, having a computer program stored thereon, the computer program being executed by a processor to cause a computer to implement the video decoding method described in the above embodiment or the video coding method described in the above embodiment.

According to an aspect of the embodiments, an electronic device may be provided, including: one or more processors; and a storage apparatus, configured to store one or more programs that, when executed by the one or more processors, cause the electronic device to implement the video decoding method described in the above embodiment or the video coding method described in the above embodiment.

According to an aspect of this embodiment, a computer program product or a computer program may be provided, the computer program product or the computer program including computer instructions, the computer instructions being stored in a computer-readable storage medium. A processor of a computer device reads the computer instructions from the computer-readable storage medium, and executes the computer instructions, to cause the computer device to implement the video decoding method provided in the above various optional embodiments or the video coding method provided in the above various optional embodiments.

In the technical solutions provided in some embodiments, the quantization coefficients in the specified region in the quantization coefficient block are calculated to obtain the quantization coefficient statistics value, and then it is determined according to the quantization coefficient statistics value whether to skip the inverse transform process. In this way, whether a coder end skips the transform process can be implicitly indicated by using the quantization coefficients in the quantization coefficient block, so that a decoder end can determine whether to perform an inverse transform process, which avoids coding of a transform skip flag for each CU by the coder end, thereby effectively improving video coding efficiency.

It is to be understood that the foregoing general descriptions and the following detailed descriptions are merely for illustration and explanation purposes and are not intended to be limited herein.

BRIEF DESCRIPTION OF THE DRAWINGS

To describe the technical solutions of example embodiments of this disclosure more clearly, the following briefly introduces the accompanying drawings for describing the example embodiments. The accompanying drawings herein are incorporated into the specification and constitute a part of this specification, show embodiments that conform to the disclosure, and are used for describing a principle of the disclosure together with this specification. The accompanying drawings described below are merely some embodiments of the disclosure, and a person of ordinary skill in the art may further obtain other accompanying drawings according to the accompanying drawings without creative efforts. In addition, one of ordinary skill would understand that aspects of example embodiments may be combined together or implemented alone. In the accompanying drawings.

DESCRIPTION OF EMBODIMENTS

Exemplary implementations are now described more comprehensively with reference to the accompanying drawings. However, the examples of implementations may be implemented in various forms, and it should not be understood as being limited to the examples described herein; and conversely, the implementations are provided to make the disclosure more comprehensive and complete, and comprehensively convey the idea of the examples of the implementations to a person skilled in the art.

In addition, the described features, structures, or characteristics may be combined in one or more embodiments in any appropriate manner. In the following descriptions, a lot of specific details are provided to give a comprehensive understanding of the embodiments. However, a person skilled in the art is to be aware that, the technical solutions may be implemented without one or more of the particular details, or another method, unit, code, apparatus, or operation may be used. In other cases, well-known methods, apparatuses, implementations, or operations are not shown or described in detail, to avoid obscuring the aspects of the present disclosure.

The block diagrams shown in the accompany drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

"Plurality of" mentioned in the specification means two or more. "And/or" describes an association relationship for describing associated objects and represents that three relationships may exist. For example, A and/or B may represent the following three cases: only A exists, both A and B exist, and only B exists. The character "/" generally indicates an "or" relationship between the associated objects.

Figure 1:
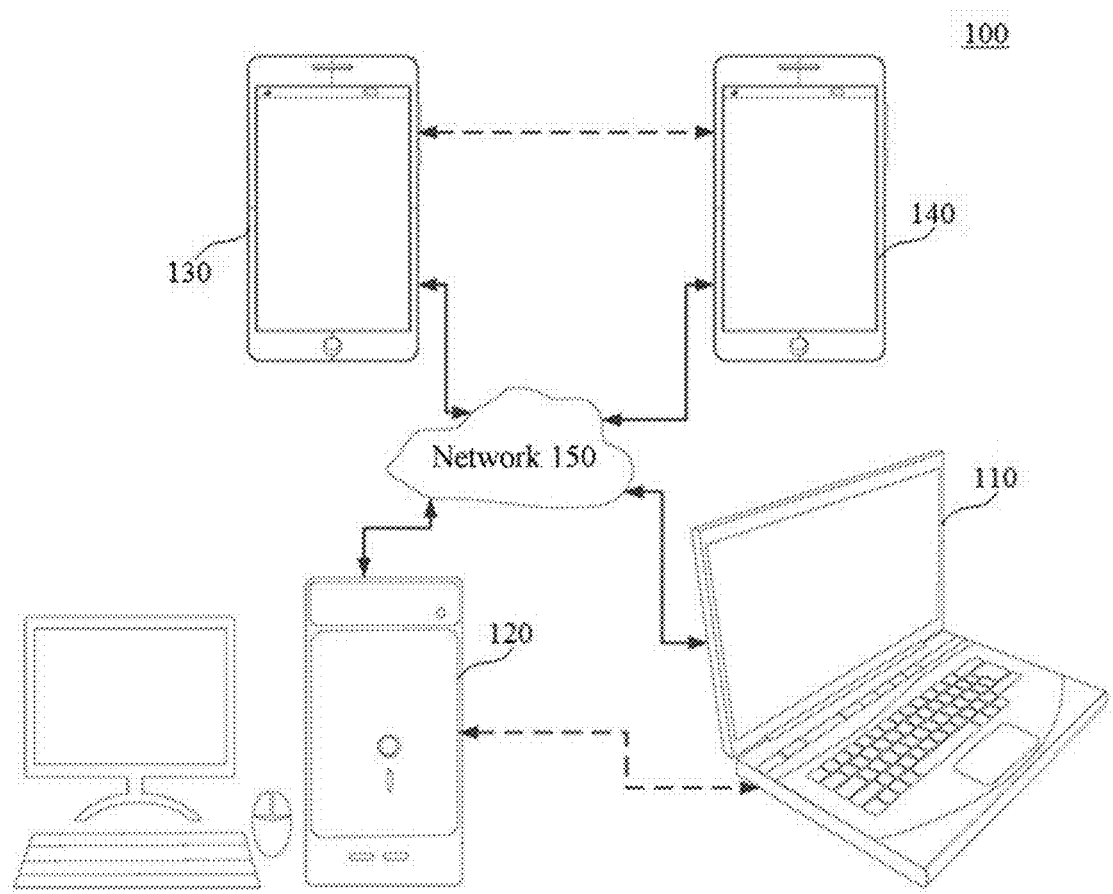
FIG. 1 is a schematic diagram of an exemplary system architecture to which the technical solutions of some embodiments are applicable.

FIG. 1 is a schematic diagram of an exemplary system architecture to which the technical solutions of some embodiments are applicable.

As shown in FIG. 1, a system architecture 100 includes a plurality of terminal devices that can communicate with each other through, for example, a network 150. For example, the system architecture 100 may include a first terminal device 110 and a second terminal device 120 connected by the network 150. In the embodiment of FIG. 1, the first terminal device 110 and the second terminal device 120 perform unidirectional data transmission.

For example, the first terminal device 110 may code video data (for example, a video picture stream captured by the first terminal device 110) and transmit the video data to the second terminal device 120 through the network 150. The coded video data is transmitted in a form of one or more coded video bit streams. The second terminal device 120 may receive the coded video data through the network 150, decode the coded video data to restore the video data, and display a video picture according to the restored video data.

In some embodiments, the system architecture 100 may include a third terminal device 130 and a fourth terminal device 140 that perform bidirectional transmission of the coded video data. The bidirectional transmission may occur, for example, during a video conference. During the bidirectional data transmission, each of the third terminal device 130 and the fourth terminal device 140 may code video data (for example, a video picture stream captured by the terminal device) and transmit the video data to the other of the third terminal device 130 and the fourth terminal device 140 through the network 150. Each of the third terminal device 130 and the fourth terminal device 140 may alternatively receive coded video data transmitted by the other of the third terminal device 130 and the fourth terminal device 140, and may decode the coded video data to restore the video data, and may display a video picture on an accessible display apparatus according to the restored video data.

In the embodiment of FIG. 1, the first terminal device 110, the second terminal device 120, the third terminal device 130, and the fourth terminal device 140 may be servers, personal computers, or smart phones, but the principles disclosed may not be limited thereto. The embodiments disclosed herein are applicable to laptop computers, tablet computers, media players, and/or dedicated videoconferencing devices. The network 150 is any type of network that transmits coded video data among the first terminal device 110, the second terminal device 120, the third terminal device 130, and the fourth terminal device 140, including, for example, wired and/or wireless communication network. The communication network 150 may exchange data in circuit switching and/or packet switching channels. The network 150 may include a telecommunications network, a local area network, a wide area network, and/or the Internet. In an example embodiment, an architecture and a topology of network 150 may be immaterial to the operations disclosed in the disclosure.

Figure 2:
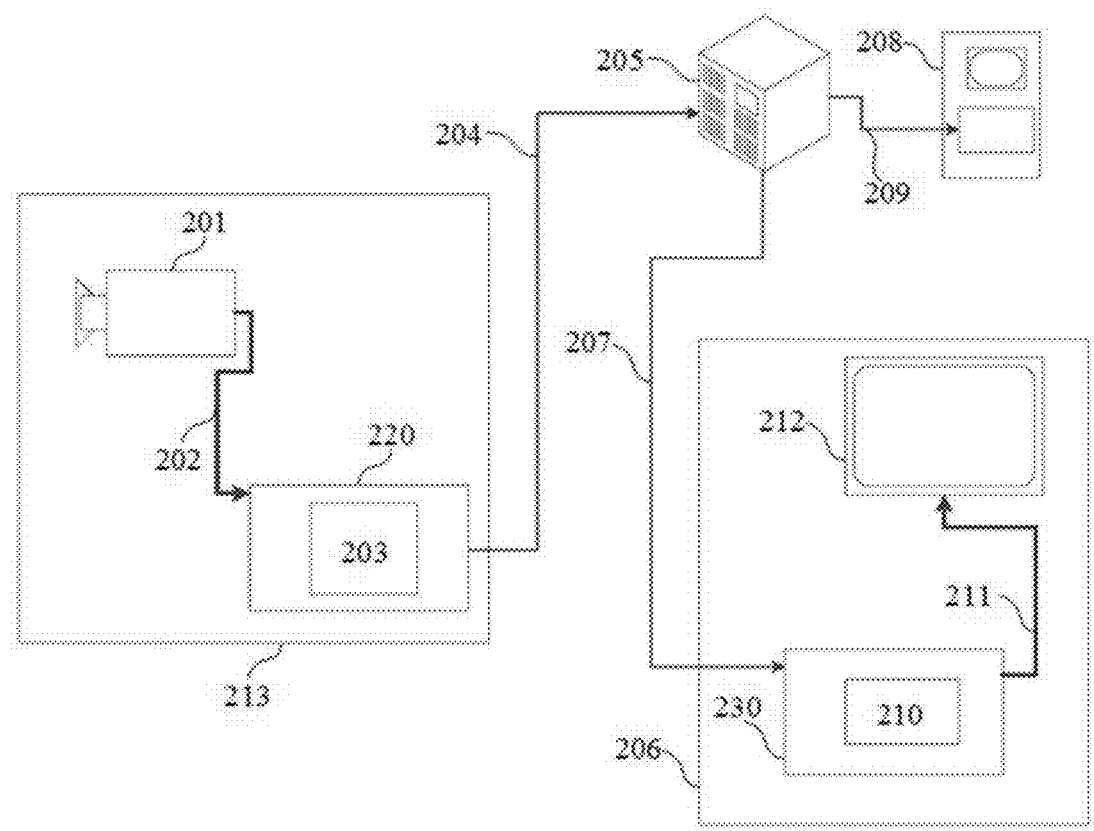
FIG. 2 is a schematic diagram of placement of a video coding apparatus and a video decoding apparatus in a streaming transmission system.

FIG. 2 shows placement of a video coding apparatus and a video decoding apparatus in a streaming transmission environment in some embodiments. The subject disclosed in the embodiments of the disclosure may be applicable to other applications supporting videos, including, for example, videoconferencing, digital television (TV), and storage of compressed videos on digital media including a compact disc (CD), a digital video disc (DVD), a memory stick, and the like.

A streaming transmission system may include a capture subsystem 213. The capture subsystem 213 may include a video source 201 such as a digital camera. The video source 201 creates an uncompressed video picture stream 202. In an embodiment, the video picture stream 202 includes samples captured by the digital camera. Compared with coded video data 204 (or a coded video bit stream 204), the video picture stream 202 is depicted by using a thick line to emphasize a high data volume of the video picture stream. The video picture stream 202 may be processed by an electronic device 220. The electronic device 220 includes a video coding apparatus 203 coupled to video source 201. The video coding apparatus 203 may include hardware, software, or a combination of hardware and software to implement or execute various aspects of the disclosed subject described in greater detail below. Compared with the video picture stream 202, the coded video data 204 (or the coded video bit stream 204) is depicted by using a thin line to emphasize a low data volume of the coded video data 204 (or the coded video bit stream 204). The coded video data 204 (or the coded video bit stream 204) may be stored on the streaming transmission server 205 for future use.

One or more stream client subsystems, such as a client subsystem 206 and a client subsystem 208 in FIG. 2, may access streaming transmission server 205 to retrieve a copy 207 and a copy 209 of the coded video data 204. The client subsystem 206 may include, for example, a video decoding apparatus 210 in an electronic device 230. The video decoding apparatus 210 decodes the received copy 207 of the coded video data, and generates an output video picture stream 211 that can be presented on a display 212 (for example, a display screen) or another display apparatus. In some streaming transmission systems, the coded video data 204, the copy 207 of the video data 204, and the copy 209 of the video data 204 (for example, the video bit stream) may be coded according to some video coding/compression standards. Embodiments of the standards include ITU-T H.265. In an embodiment, a video coding standard under development is informally referred to as Versatile Video Coding (VVC), and the embodiments disclosed herein may be used in context of the VVC standard.

The electronic device 220 and the electronic device 230 may include other components not shown in the figures. For example, the electronic device 220 may include a video decoding apparatus, and the electronic device 230 may further include a video coding apparatus.

In some embodiments, taking the international video coding standard such as High Efficiency Video Coding (HEVC), the VVC, and the Chinese national video coding standard such as Audio Video Coding Standard (AVS) as examples, when a video image frame is inputted, the video image frame is partitioned into a plurality of non-overlapping to-be-processed units according to a block size, and similar operations are performed on the to-be-processed unit. The processing unit is referred to as a coding tree unit (CTU) or a largest coding unit (LCU). The CTU may be further partitioned to obtain one or more basic coding units (CU). The CU is the most basic element in a coding process. Some concepts during coding of a CU are described below.

Predictive coding: The predictive coding includes modes such as intra prediction and inter prediction. After an original video signal is predicted by using a selected reconstructed video signal, a residual video signal is obtained. A coder end needs to determine a predictive coding mode for a current CU and notifies a decoder end. Intra prediction means that a predicted signal comes from a region in a same image that has been coded and reconstructed. Inter prediction means that a predicted signal comes from another coded image (referred to as a reference image) that is different from a current image.

Transform & quantization: A residual video signal is transformed into a transform domain through a transform operation such as discrete Fourier transform (DFT) or discrete cosine transform (DCT), to generate a transform coefficient. A lossy quantization operation is further performed on the transform coefficient, which loses a specific amount of information, so that the quantized signal facilitates compressed expression. In some video coding standards, there may be more than one transform manner for selection. Therefore, the coder end needs to select a transform manner for the current CU and notifies the decoder end. The fineness of quantization usually depends on a quantization parameter (QP). A lager value of the QP represents that coefficients within a larger range will be quantized as a same output, and therefore, may usually bring a larger distortion and a lower bit rate. Conversely, a smaller value of the QP represents that coefficients within a smaller range will be quantized as a same output, and therefore, may usually bring a smaller distortion while corresponding to a higher bit rate.

Entropy coding or statistical coding: Statistical compression coding is performed quantized transform domain signals according to frequencies of occurrence of values, and finally, a binarized (0 or 1) compressed bitstream is outputted. In addition, entropy coding is also required to be performed on other information generated during the coding, such as the selected coding mode and motion vector data, to reduce a bit rate. Statistical coding is a lossless coding manner that can effectively reduce a bit rate required for expressing a same signal. A common statistical coding manner includes variable length coding (VLC for short) or context adaptive binary arithmetic coding (CABAC for short).

Loop filtering: Operations such as inverse quantization, inverse transform, and predictive compensation are performed on a transformed and quantized signal to obtain a reconstructed image. The reconstructed image has some information different from that in an original image as a result of quantization, that is, the reconstructed image has distortion. Therefore, a filtering operation may be performed on the reconstructed image by using filters such as a deblocking filter (DB), a sample adaptive offset (SAO) filter, or an adaptive loop filter (ALF), which can effectively reduce a degree of distortion caused by quantization. Since the filtered reconstructed image will be used as a reference for subsequently coding images so as to predict future image signals, the above filtering operation is also referred to as loop filtering, that is, a filtering operation in a coding loop.

Figure 3:
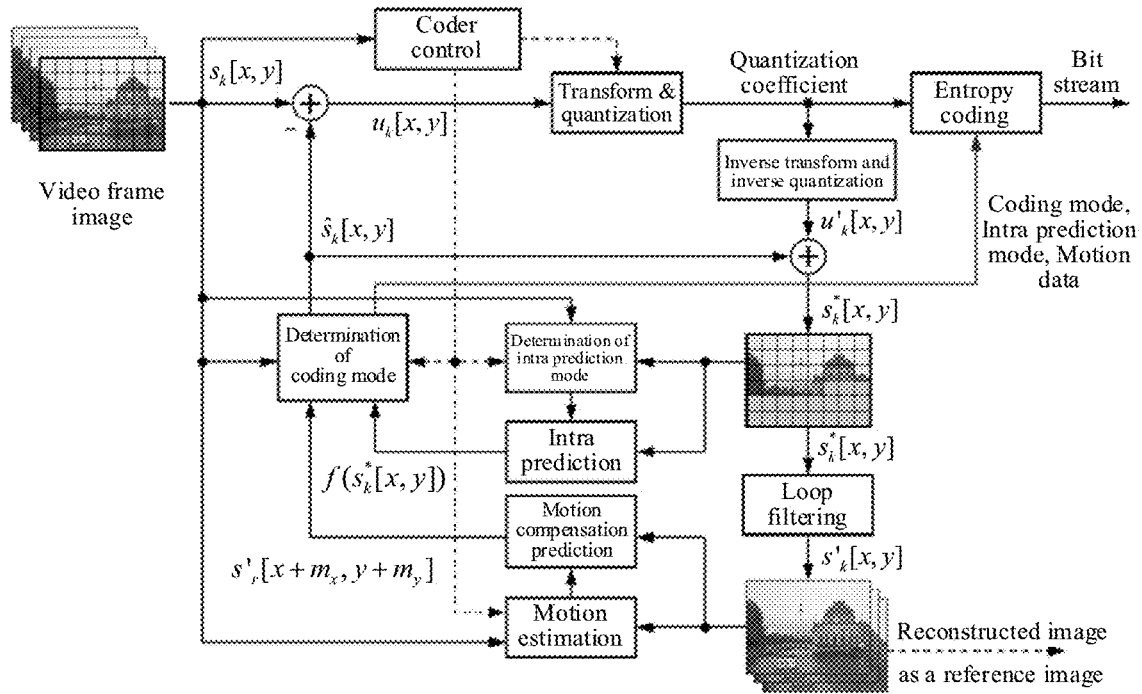
FIG. 3 is a basic flowchart of a video coder.

FIG. 3 is a basic flowchart of a video coder in some embodiments. In this process, intra prediction is used as an example for description. A difference between an original image signal $s_k[x,y]$ and a predicted image signal $\hat{s}_k[x,y]$ is calculated to obtain a residual signal $u_k[x,y]$, and the residual signal $u_k[x,y]$ is transformed and quantized to obtain a quantization coefficient. The quantization coefficient is subjected to entropy coding to obtain a coded bit stream, and is further subjected to inverse quantization and inverse transform to obtain a reconstructed residual signal $u_k'[x,y]$. The predicted image signal $\hat{s}_k[x,y]$ is superimposed with the reconstructed residual signal $u_k'[x,y]$ to generate an image signal $s_k^*[x,y]$. The image signal $s_k^*[x,y]$ is inputted to an intra mode decision module and an intra prediction module for intra prediction, and is further subjected to loop filtering to output a reconstructed image signal $s_k'[x,y]$. The reconstructed image signal $s_k'[x,y]$ may be used as a reference image for a next frame for motion estimation and motion compensation prediction. Then a predicted image signal $s_k'[x,y]$ of the next frame is obtained based on a result $s_r'[x+m_x, y+m_y]$ of the motion compensation prediction and a result $f(s_k^*[x,y])$ of the intra prediction. The above process is repeated until the coding is completed.

Figure 4:
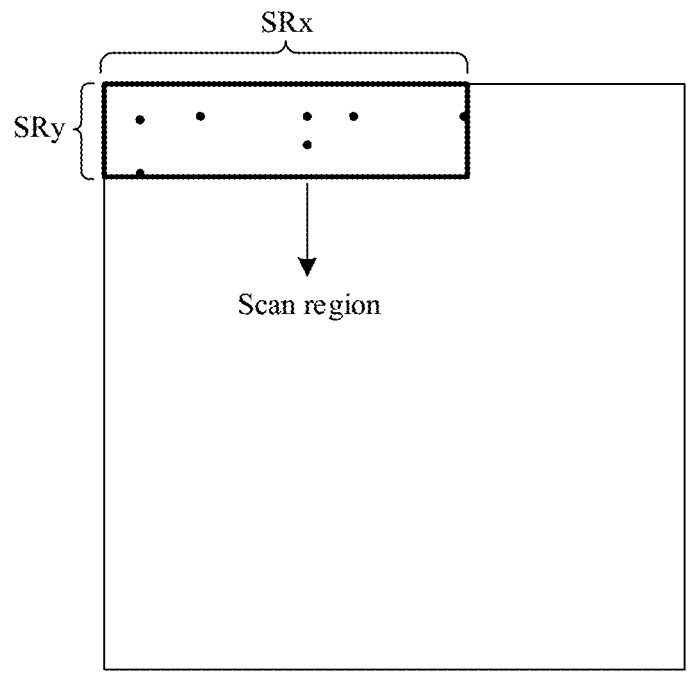
FIG. 4 shows a scanning region marked by a scan region-based coefficient coding (SRCC) technology.
Figure 5:
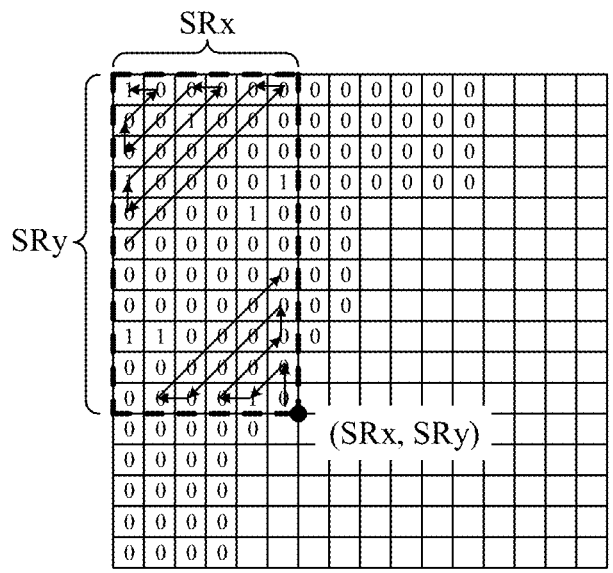
FIG. 5 is a schematic diagram of an order of scanning a marked to-be-scanned region.

In addition, in a quantization coefficient block obtained after the residual signal is transformed and quantized, non-zero coefficients tend to concentrate in left and upper regions of the block, while right and lower regions of the block are usually 0. Therefore, a scan region-based coefficient coding (SRCC) technology is introduced. With the SRCC technology, a size SRx×SRy of left and upper regions where non-zero coefficients in each quantization coefficient block (having a size of W×H) are located can be marked. SRx is an abscissa of a rightmost non-zero coefficient in the quantization coefficient block, SRy is an ordinate of a lowermost non-zero coefficient in the quantization coefficient block, $1 \leq SRx \leq W$, and $1 \leq SRy \leq H$. Coefficients outside the region are all 0. The SRCC technology uses (SRx, SRy) to determine a quantization coefficient region in a quantization coefficient block that needs to be scanned. As shown in FIG. 4, only quantization coefficients in a to-be-scanned region marked by (SRx, SRy) need to be coded. For example, as shown in FIG. 5, a scan order during the coding may be a reverse zigzag scan form from a lower right corner toward an upper left corner.

Based on the above coding process, on the decoder end, for each CU, after a compressed bit stream is acquired, entropy decoding is performed to obtain various mode information and quantization coefficients. Then inverse quantization and inverse transform are performed on the quantization coefficients to obtain a residual signal. Moreover, a predicted signal corresponding to the CU can be obtained according to coding mode information that is known. Then the residual signal may be added to the predicted signal to obtain a reconstructed signal. The reconstructed signal is then subjected to operations such as loop filtering to generate a final output signal.

During the above coding and decoding, the transform processing performed on the residual signal causes energy of the residual signal to concentrate on few low-frequency coefficients, that is, most coefficients have relatively small values. After processing by a subsequent quantization module, the relatively small coefficient values become zero, which greatly reduces costs of coding the residual signal. However, due to diversified residual distribution, the DCT cannot adapt to all residual characteristics. Therefore, transform kernels such as discrete sine transform 7 (DST7) and discrete cosine transform 8 (DCT8) are applied to the transform process, and horizontal transform and vertical transform of the residual signal can be performed by using different transform kernels. Taking an adaptive multiple core transform (AMT) technology as an example, possible transform combinations for transform processing of the residual signal are as follows: (DCT2, DCT2), (DCT8, DCT8), (DCT8, DST7), (DST7, DCT8), and (DST7, DST7).

A specific transform combination for the residual signal is required to be determined through rate-distortion optimization (RDO) on the coder end. For some residual blocks having a weak correlation, coding efficiency can even be improved if the quantization process is directly performed while skipping the transform process. Whether to skip the transform process is also required to be determined through RDO on the coder end. However, this manner requires to code a transform skip flag for each CU to indicate whether the transform process is skipped, which results in relatively low video coding efficiency.

In view of the above problems, the embodiments of the disclosure propose to implicitly indicate, by using quantization coefficients in a quantization coefficient block, whether the transform process of the residual data is skipped, so that coding of the transform skip flag can be omitted, which effectively improves the video coding efficiency.

Figure 6:
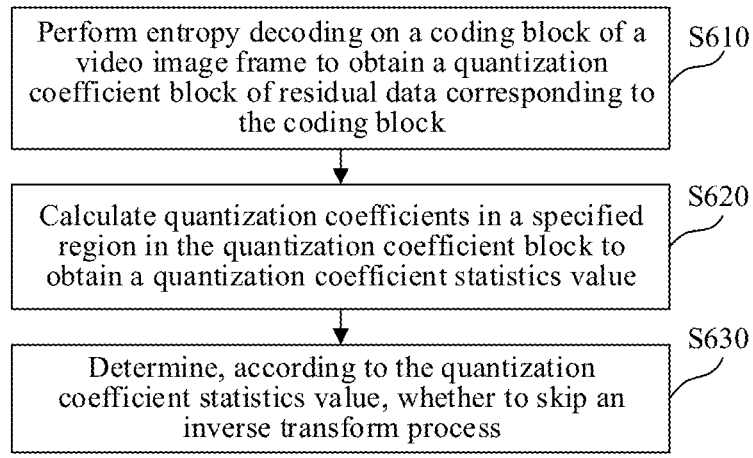
FIG. 6 is a flowchart of a video decoding method according to some embodiments.

FIG. 6 is a flowchart of a video decoding method according to some embodiments. The video decoding method may be performed by an electronic device. The electronic device is a device with a computing processing function, such as a terminal device or a server. As shown in FIG. 6, the video decoding method includes at least operations S610 to S630, which are described in detail as follows:

Operation S610: Perform entropy decoding on a coding block of a video image frame to obtain a quantization coefficient block of residual data corresponding to the coding block.

In an example embodiment, a video image frame sequence includes a series of video image frames. Each video image frame may be further partitioned into slices. Each slice may be further partitioned into a series of LCUs (or CTUs). Each LCU includes a plurality of CUs. The video image frame is coded by block during coding. In some new video coding standards, such as the H.264 standard, a macroblock (MB) is introduced. The MB may be further partitioned into a plurality of prediction blocks that may be used for predictive coding. In the HEVC standard, description is provided basic concepts such as a CU, a prediction unit (PU), and a transform unit (TU) are used, and various block units are partitioned according to functions, and a new tree-based structure is used for description. For example, a CU may be partitioned into smaller CUs according to a quadtree, and the smaller CUs may be further partitioned to form a quadtree structure. The coding block in this embodiment may be a block obtained by coding a CU or a block obtained by coding a block smaller than a CU (for example, a smaller block obtained by dividing a CU).

The coding block of the video image frame is obtained by performing video coding on the residual data corresponding to the coding block. A final operation of video coding is to perform entropy coding on the quantization coefficient block of the residual data. Therefore, during the video decoding, it is necessary to first perform entropy decoding on the coding block of the video image frame. After the entropy decoding, the quantization coefficient block of the residual data corresponding to the coding block is obtained.

Operation S620: Calculate quantization coefficients in a specified region in the quantization coefficient block to obtain a quantization coefficient statistics value.

In an example embodiment, after the quantization coefficient block of the residual data is obtained, the quantization coefficients in the specified region in the quantization coefficient block are directly calculated. Additionally, in some embodiments, the quantization coefficients in the specified region in the quantization coefficient block are calculated in response to determining that determination as to whether to skip the inverse transform process needs to be made according to the quantization coefficients in the quantization coefficient block.

In an example embodiment, that determination as to whether to skip an inverse transform process for all coding blocks in first coded data corresponding to a video image frame sequence needs to be made according to quantization coefficients in a quantization coefficient block obtained through entropy decoding may be indicated by using a specified index identifier included in a sequence header of the first coded data. The indication for all of the coding blocks corresponding to the entire video image frame sequence is realized through the index identifier in the sequence header of the first coded data corresponding to the video image frame sequence, so that bits occupied by index identifiers can be effectively reduced, thereby improving video coding efficiency.

In an example embodiment, that determination as to whether to skip an inverse transform process for all coding blocks in second coded data corresponding to a video image frame needs to be made according to quantization coefficients in a quantization coefficient block obtained through entropy decoding may be indicated by using a specified index identifier included in an image header of the second coded data. The indication for all of the coding blocks corresponding to the entire video image frame is realized through the index identifier in the image header of the second coded data corresponding to the video image frame, so that bits occupied by index identifiers can be reduced, thereby improving video coding efficiency.

In an example embodiment, that determination as to whether to skip an inverse transform process for all coding blocks in third coded data corresponding to a slice of a video image frame needs to be made according to quantization coefficients in a quantization coefficient block obtained through entropy decoding may be indicated by using a specified index identifier included in a slice header of the third coded data. The indication for all of the coding blocks corresponding to the entire slice is realized through the index identifier in the slice header of the third coded data corresponding to the slice of the video image frame, so that bits occupied by index identifiers can be reduced, thereby improving video coding efficiency.

In an example embodiment, that determination as to whether to skip an inverse transform process for all coding blocks in fourth coded data corresponding to an LCU of a video image frame needs to be made according to quantization coefficients in a quantization coefficient block obtained through entropy decoding may be indicated by using a specified index identifier included in an LCU header of the fourth coded data. In the technical solution in this embodiment, the indication for all of the coding blocks corresponding to the entire LCU is realized through the index identifier in the LCU header of the fourth coded data corresponding to the video image frame, so that bits occupied by index identifiers can be reduced, thereby improving video coding efficiency.

In an example embodiment, whether determination as to whether to skip the inverse transform process for the coding blocks needs to be made according to the quantization coefficients in the quantization coefficient block obtained through entropy decoding may be determined according to a relationship between sizes of the coding blocks and a reference threshold range. For example, if the relationship between the sizes of the coding blocks and the reference threshold range satisfies a reference condition, determination as to whether to skip the inverse transform process for the coding blocks needs to be made according to the quantization coefficients in the quantization coefficient block obtained through entropy decoding. If the relationship between the sizes of the coding blocks and the reference threshold range does not satisfy the reference condition, determination as to whether to skip the inverse transform process for the coding blocks does not need to be made according to the quantization coefficients in the quantization coefficient block obtained through entropy decoding. Whether the reference conditions are satisfied is configured according to experience, or is flexibly adjusted according to an application scenario. This is not limited thereto.

Satisfying the reference condition, for example, means that the sizes of the coding blocks are within the reference threshold range. The reference threshold range may be a range composed of a lower threshold and an upper threshold, or may be a range less than a specified threshold, or may be a range greater than a specified threshold. This is not limited herein. For example, in a case that the reference threshold range is a range less than the specified threshold, if the sizes of the coding blocks are relatively small (for example, less than a specified threshold), it may be determined that determination as to whether to skip the inverse transform process for the coding blocks needs to be made according to the quantization coefficients in the quantization coefficient block obtained through entropy decoding. On the contrary, if the sizes of the coding blocks are relatively large (for example, greater than a specified threshold), it may be determined that determination as to whether to skip the inverse transform process for the coding blocks does not need to be made according to the quantization coefficients in the quantization coefficient block obtained through entropy decoding. In the technical solution of this embodiment, since whether determination as to whether to skip the inverse transform process needs to be made according to the quantization coefficients in the quantization coefficient block obtained through entropy decoding may be implicitly indicated according to the sizes of the coding blocks without using additional bits, the video coding efficiency can be improved.

In an example embodiment, if the index identifier included in the sequence header of the first coded data corresponding to the video image frame sequence is a first value (which may be, for example, 0), it is determined that determination as to whether to skip the inverse transform process for all of the coding blocks in the first coded data does not need to be made according to the quantization coefficients in the quantization coefficient block obtained through entropy decoding. If the index identifier included in the sequence header is a second value (which may be, for example, 1), decision may be further made according to the index identifier included in the image header of the second coded data corresponding to the video image frame in the video image frame sequence.

In an example embodiment, if the index identifier included in the sequence header is a second value (which may be, for example, 1), and the index identifier included in the image header is the first value (which may be, for example, 0), it may be determined that determination as to whether to skip the inverse transform process for all of the coding blocks in the second coded data does not need to be made according to the quantization coefficients in the quantization coefficient block obtained through entropy decoding. If the index identifier included in the sequence header and the index identifier included in the image header are both the second value (which may be, for example, 1), it may be determined that determination as to whether to skip the inverse transform process for all of the coding blocks in the second coded data needs to be made according to the quantization coefficients in the quantization coefficient block obtained through entropy decoding. In this case, the slice header, the LCU header, and the sizes of the coding blocks may be no longer used for decision.

Further, in an example embodiment, if the index identifier included in the sequence header and the index identifier included in the image header are both the second value (which may be, for example, 1), decision may be further made according to the index identifier included in the slice header of the third coded data corresponding to the slice of the video image frame. For example, if the index identifier included in the sequence header and the index identifier included in the image header are both the second value, but the index identifier included in the slice header of the third coded data corresponding to the slice is the first value (which may be, for example, 0), it may be determined that determination as to whether to skip the inverse transform process for all of the coding blocks in the third coded data does not need to be made according to the quantization coefficients in the quantization coefficient block obtained through entropy decoding. If the index identifier included in the sequence header, the index identifier included in the image header, and the index identifier included in the slice header are all the second value (which may be, for example, 1), it may be determined that determination as to whether to skip the inverse transform process for all of the coding blocks in the third coded data needs to be made according to the quantization coefficients in the quantization coefficient block obtained through entropy decoding. In this case, the LCU header and the sizes of the coding blocks may be no longer used for decision.

Certainly, if the index identifier included in the sequence header, the index identifier included in the image header, and the index identifier included in the slice header are all the second value (which may be, for example, 1), decision may be further made according to the index identifier included in the LCU header of the fourth coded data corresponding to the LCU of the slice. For example, if the index identifier included in the sequence header, the index identifier included in the image header, and the index identifier included in the slice header are all the second value, but the index identifier included in the LCU header of the fourth coded data corresponding to the LCU is the first value (which may be, for example, 0), it may be determined that determination as to whether to skip the inverse transform process for all of the coding blocks in the fourth coded data does not need to be made according to the quantization coefficients in the quantization coefficient block obtained through entropy decoding. If the index identifier included in the sequence header, the index identifier included in the image header, the index identifier included in the slice header, and the index identifier included in the LCU header are all the second value (which may be, for example, 1), it may be determined that determination as to whether to skip the inverse transform process for all of the coding blocks in the fourth coded data needs to be made according to the quantization coefficients in the quantization coefficient block obtained through entropy decoding. In this case, the sizes of the coding blocks may be no longer used for decision.

In some embodiments, if the index identifier included in the sequence header, the index identifier included in the image header, the index identifier included in the slice header, and the index identifier included in the LCU header are all the second value (which may be, for example, 1), decision may be further made according to the sizes of the coding blocks. For example, if the index identifier included in the sequence header, the index identifier included in the image header, the index identifier included in the slice header, and the index identifier included in the LCU header are all the second value, but the sizes of the coding blocks are relatively small (for example, less than a specified threshold), it may be determined that determination as to whether to skip the inverse transform process for the coding blocks needs to be made according to the quantization coefficients in the quantization coefficient block obtained through entropy decoding. On the contrary, if the sizes of the coding blocks are relatively large (for example, greater than a specified threshold), it may be determined that determination as to whether to skip the inverse transform process for the coding blocks does not need to be made according to the quantization coefficients in the quantization coefficient block obtained through entropy decoding.

Whether determination as to whether to skip the inverse transform process needs to be made according quantization coefficients in the quantization coefficient block may be determined in the following manners:

1. Indication merely by using the index identifier in the sequence header without decision making by using the image header, the slice header, the LCU header, and the sizes of the coding blocks. For example, if the index identifier in the sequence header is 1 (which is merely an example), it indicates that determination as to whether to skip the inverse transform process for all of the coding blocks in the first coded data corresponding to the video image frame sequence needs to be made according to the quantization coefficients in the quantization coefficient block obtained through entropy decoding.
2. Indication merely by using the index identifier in the image header without decision making by using the sequence header, the slice header, the LCU header, and the sizes of the coding blocks. For example, if the index identifier in the image header is 1 (which is merely an example), it indicates that determination as to whether to skip the inverse transform process for all of the coding blocks in the second coded data corresponding to the video image frame needs to be made according to the quantization coefficients in the quantization coefficient block obtained through entropy decoding.
3. Indication merely by using the index identifier in the slice header without decision making by using the sequence header, the image header, the LCU header, and the sizes of the coding blocks. For example, if the index identifier in the slice header is 1 (which is merely an example), it indicates that determination as to whether to skip the inverse transform process for all of the coding blocks in the third coded data corresponding to the slice needs to be made according to the quantization coefficients in the quantization coefficient block obtained through entropy decoding.
4. Indication merely by using the index identifier in the LCU header without decision making by using the sequence header, the image header, the slice header, and the sizes of the coding blocks. For example, if the index identifier in the LCU header is 1 (which is merely an example), it indicates that determination as to whether to skip the inverse transform process for all of the coding blocks in the fourth coded data corresponding to the LCU needs to be made according to the quantization coefficients in the quantization coefficient block obtained through entropy decoding.
5. Implicit indication merely by using the sizes of the coding blocks without decision making by using the sequence header, the image header, the slice header, and the LCU header. For example, if the sizes of the coding blocks are relatively small (for example, less than a specified threshold), it may be determined that determination as to whether to skip the inverse transform process for the coding blocks needs to be made according to the quantization coefficients in the quantization coefficient block obtained through entropy decoding. On the contrary, if the sizes of the coding blocks are relatively large (for example, greater than a specified threshold), it may be determined that determination as to whether to skip the inverse transform process for the coding blocks does not need to be made according to the quantization coefficients in the quantization coefficient block obtained through entropy decoding.
6. Indication by using the index identifier in the sequence header and the index identifier in the image header without decision making by using the slice header, the LCU header, and the sizes of the coding blocks. For example, if the index identifier in the sequence header and the index identifier in the image header are both 1 (which is merely an example), it indicates that determination as to whether to skip the inverse transform process for all of the coding blocks in the second coded data corresponding to the video image frame needs to be made according to the quantization coefficients in the quantization coefficient block obtained through entropy decoding. If the index identifier in the sequence header is 1, but the index identifier in the image header is 0 (which is merely an example), it indicates that determination as to whether to skip the inverse transform process for all of the coding blocks in the second coded data corresponding to the video image frame does not need to be made according to the quantization coefficients in the quantization coefficient block obtained through entropy decoding.
7. Indication by using the index identifier in the sequence header, the index identifier in the image header, and the index identifier in the slice header without decision making by using the LCU header and the sizes of the coding blocks. For example, if the index identifier in the sequence header, the index identifier in the image header, and the index identifier in the slice header are all 1 (which is merely an example), it indicates that determination as to whether to skip the inverse transform process for all of the coding blocks in the third coded data corresponding to the slice needs to be made according to the quantization coefficients in the quantization coefficient block obtained through entropy decoding. For example, if the index identifier in the sequence header and the index identifier in the image header are 1, but the index identifier in the slice header is 0 (which is merely an example), it indicates that determination as to whether to skip the inverse transform process for all of the coding blocks in the third coded data corresponding to the slice does not need to be made according to the quantization coefficients in the quantization coefficient block obtained through entropy decoding.
8. Indication by using the index identifier in the sequence header, the index identifier in the image header, the index identifier in the slice header, and the index identifier in the LCU header without decision making by using the sizes of the coding blocks. For example, if the index identifier in the sequence header, the index identifier in the image header, the index identifier in the slice header, and the index identifier in the LCU header are all 1 (which is merely an example), it indicates that determination as to whether to skip the inverse transform process for all of the coding blocks in the fourth coded data corresponding to the LCU needs to be made according to the quantization coefficients in the quantization coefficient block obtained through entropy decoding. If the index identifier in the sequence header, the index identifier in the image header, and the index identifier in the slice header are 1, but the index identifier in the LCU header is 0 (which is merely an example), it indicates that determination as to whether to skip the inverse transform process for all of the coding blocks in the fourth coded data corresponding to the LCU does not need to be made according to the quantization coefficients in the quantization coefficient block obtained through entropy decoding.

9. Decision making by using the index identifier in the sequence header, the index identifier in the image header, the index identifier in the slice header, the index identifier in the LCU header, and the sizes of the coding blocks. For example, if the index identifier in the sequence header, the index identifier in the image header, the index identifier in the slice header, and the index identifier in the LCU header are all 1 (which is merely an example), and the sizes of the coding blocks are less than the specified threshold, it indicates that determination as to whether to skip the inverse transform process for the coding blocks needs to be made according to the quantization coefficients in the quantization coefficient block obtained through entropy decoding. If the index identifier in the sequence header, the index identifier in the image header, the index identifier in the slice header, and the index identifier in the LCU header are all 1, but the sizes of the coding blocks are greater than the specified threshold, it indicates that determination as to whether to skip the inverse transform process for the coding blocks does not need to be made according to the quantization coefficients in the quantization coefficient block obtained through entropy decoding.

Certainly, the following manners are also applicable.

10. Indication by using the index identifier in the image header and the index identifier in the slice header without decision making by using the sequence header, the LCU header and the sizes of the coding blocks. For example, if the index identifier in the image header and the index identifier in the slice header are 1 (which is merely an example), it indicates that determination as to whether to skip the inverse transform process for all of the coding blocks in the third coded data corresponding to the slice needs to be made according to the quantization coefficients in the quantization coefficient block obtained through entropy decoding. Additionally, for example, if the index identifier in the image header is 1, but the index identifier in the slice header is 0 (which is merely an example), it indicates that determination as to whether to skip the inverse transform process for all of the coding blocks in the third coded data corresponding to the slice does not need to be made according to the quantization coefficients in the quantization coefficient block obtained through entropy decoding.

11. Indication by using the index identifier in the image header, the index identifier in the slice header, and the index identifier in the LCU header without decision making by using the index identifier in the sequence header and the sizes of the coding blocks. Exemplarily, if the index identifier in the image header, the index identifier in the slice header, and the index identifier in the LCU header are all 1 (which is merely an example), it indicates that determination as to whether to skip the inverse transform process for all of the coding blocks in the fourth coded data corresponding to the LCU needs to be made according to the quantization coefficients in the quantization coefficient block obtained through entropy decoding. If the index identifier in the image header and the index identifier in the slice header are 1, but the index identifier in the LCU header is 0 (which is merely an example), it indicates that determination as to whether to skip the inverse transform process for all of the coding blocks in the fourth coded data corresponding to the LCU does not need to be made according to the quantization coefficients in the quantization coefficient block obtained through entropy decoding.

12. Decision making by using the index identifier in the image header, the index identifier in the slice header, the index identifier in the LCU header, and the sizes of the coding blocks without using the index identifier in the sequence header. If the index identifier in the image header, the index identifier in the slice header, and the index identifier in the LCU header are all 1 (which is merely an example), and the sizes of the coding blocks are less than the specified threshold, it indicates that determination as to whether to skip the inverse transform process for the coding blocks needs to be made according to the quantization coefficients in the quantization coefficient block obtained through entropy decoding. If the index identifier in the image header, the index identifier in the slice header, and the index identifier in the LCU header are all 1, but the sizes of the coding blocks is greater than the specified threshold, it indicates that determination as to whether to skip the inverse transform process for the coding blocks does not need to be made according to the quantization coefficients in the quantization coefficient block obtained through entropy decoding.

In addition, more indication manners are applicable in the embodiments the disclosure, which are not described in detail.

In an example embodiment, during calculation of the quantization coefficients in the specified region in the quantization coefficient block, the quantization coefficients in the specified region may be calculated according to values of the quantization coefficients in the specified region in the quantization coefficient block to obtain a calculated result, and the calculated result is directly used as a quantization coefficient statistics value. Alternatively, after the calculated result is obtained, a remainder of the calculated result for a specified value may be calculated, and the remainder may be used as the quantization coefficient statistics value. For example, the specified value may be any non-zero number, such as 2, 3, or 4.

In some embodiments, during calculation of the quantization coefficients in the specified region according to the values of the quantization coefficients in the specified region in the quantization coefficient block, a sum of the values of the quantization coefficients in the specified region may be calculated, and the obtained sum is used as the calculated result. Alternatively, a sum of absolute values of the quantization coefficients in the specified region may be calculated, and the obtained sum is used as the calculated result. Alternatively, values of odd-valued quantization coefficients in the specified region may be converted to first values and values of even-valued quantization coefficients in the specified region may be converted to second values first, then a sum of the values of the quantization coefficients in the specified region after conversion of the values is calculated, and the obtained sum is used as the calculated result. One of the first values and the second values is an odd number, and the other thereof is an even number.

For example, the values of the odd-valued quantization coefficients in the specified region are converted to 1, and the values of the even-valued quantization coefficients are converted to 0. Alternatively, the values of the odd-valued quantization coefficients in the specified region are converted to 0, and the values of the even-valued quantization coefficients are converted to 1. Alternatively, the values of the odd-valued quantization coefficients in the specified region are converted to 3, and the values of the even-valued quantization coefficients are converted to 2. Alternatively, the values of the odd-valued quantization coefficients in the specified region are converted to 2, and the values of the even-valued quantization coefficients are converted to 3.

In some embodiments, during calculation of the quantization coefficients in the specified region according to the values of the quantization coefficients in the specified region in the quantization coefficient block, a number of odd-valued quantization coefficients in the specified region may be calculated, and the obtained number is used as the calculated result. Alternatively, a sum of values of odd-valued quantization coefficients in the specified region is calculated, and the obtained sum is used as the calculated result. Alternatively, a sum of absolute values of odd-valued quantization coefficients in the specified region is calculated, and the obtained sum is used as the calculated result. Alternatively, values of odd-valued quantization coefficients in the specified region may be converted to first values and values of even-valued quantization coefficients in the specified region may be converted to second values, then a sum of the odd values of the quantization coefficients in the specified region after conversion of the values is calculated, and the obtained sum is used as the calculated result. One of the first values and the second values is an odd number, and the other thereof is an even number.

In some embodiments, during calculation of the quantization coefficients in the specified region according to the values of the quantization coefficients in the specified region in the quantization coefficient block, a number of even-valued quantization coefficients in the specified region may be calculated, and the obtained number is used as the calculated result. Alternatively, a sum of values of even-valued quantization coefficients in the specified region is calculated, and the obtained sum is used as the calculated result. Alternatively, a sum of absolute values of even-valued quantization coefficients in the specified region is calculated, and the obtained sum is used as the calculated result. Alternatively, values of odd-valued quantization coefficients in the specified region may be converted to first values and values of even-valued quantization coefficients in the specified region may be converted to second values, then a sum of the even values of the quantization coefficients in the specified region after conversion of the values is calculated, and the obtained sum is used as the calculated result. One of the first values and the second values is an odd number, and the other thereof is an even number.

In conclusion the quantization coefficients in the specified region may be calculated according to the values of the quantization coefficients in the specified region in the quantization coefficient block in the following manners:

1. Direct summation of the values of the quantization coefficients in the specified region.
2. Summation of the absolute values of the quantization coefficients in the specified region.
3. Summation of all of the values in the specified region after the conversion of the odd values and the even values according to parity of the quantization coefficients in the specified region.
4. Calculation of the number of the odd-valued quantization coefficients in the specified region.
5. Summation of the values of the odd-valued quantization coefficients in the specified region.
6. Summation of the absolute values of the odd-valued quantization coefficients in the specified region.
7. Summation of the odd values of all of the values in the specified region after the conversion of the odd values and the even values according to parity of the quantization coefficients in the specified region.
8. Calculation of the number of the even-valued quantization coefficients in the specified region.
9. Summation of the values of the even-valued quantization coefficients in the specified region.
10. Summation of the absolute values of the even-valued quantization coefficients in the specified region.
11. Summation of the even values of all of the values in the specified region after the conversion of the odd values and the even values according to parity of the quantization coefficients in the specified region.

In an example embodiment, the specified region may be all regions in the quantization coefficient block.

In an example embodiment, the specified region may be one or more specified locations in the quantization coefficient block.

Figure 7:
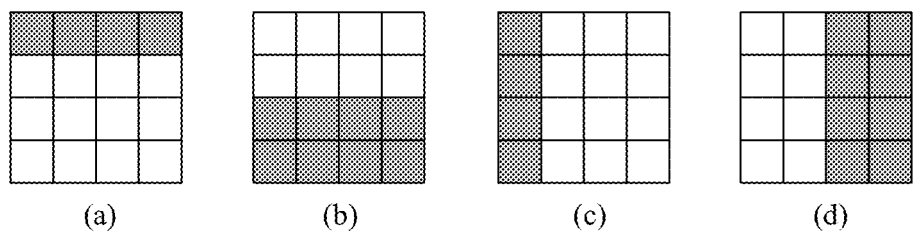
FIG. 7 is a schematic diagram of division of a specified region according to some embodiments.

In an example embodiment, the specified region may be at least one specified row in the quantization coefficient block. As shown in FIG. 7, if it is assumed that the quantization coefficient block is a 4×4 coefficient block and each square represents a quantization coefficient, one row of gray regions may be used as the specified region, as shown in (a) in FIG. 7, or two rows of gray regions may be used as the specified region, as shown in (b) in FIG. 7. The at least one row may be an upper row in the quantization coefficient block.

The specified region may be at least one specified column in the quantization coefficient block. As shown in FIG. 7, if it is assumed that the quantization coefficient block is a 4×4 coefficient block and each square represents a quantization coefficient, one column of gray regions may be used as the specified region, as shown in (c) in FIG. 7, or two columns of gray regions may be used as the specified region, as shown in (d) in FIG. 7. The at least one column may be a left column in the quantization coefficient block.

Figure 8:
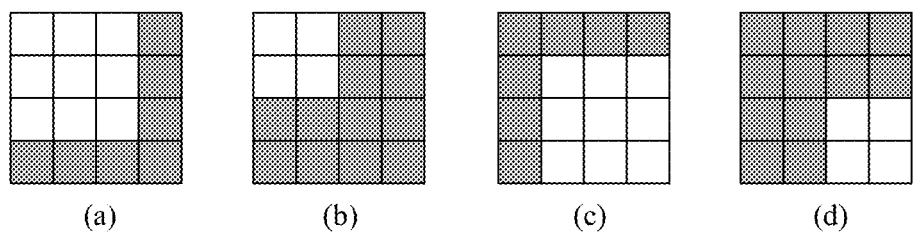
FIG. 8 is a schematic diagram of division of a specified region according to some embodiments.

In some embodiments, the specified region may be at least one specified row and at least one specified column in the quantization coefficient block. As shown in FIG. 8, if it is assumed that the quantization coefficient block is a 4×4 coefficient block and each square represents a quantization coefficient, one lower row and one right column (that is, the gray regions) may be used as the specified region, as shown in (a) in FIG. 8, or two lower rows and two right columns (that is, the gray regions) may be used as the specified region, as shown in (b) in FIG. 8, one upper row and one left column (that is, the gray regions) may be used as the specified region, as shown in (c) in FIG. 8, or two upper rows and two left columns (that is, the gray regions) may be used as the specified region, as shown in (d) in FIG. 8.

Figure 9:
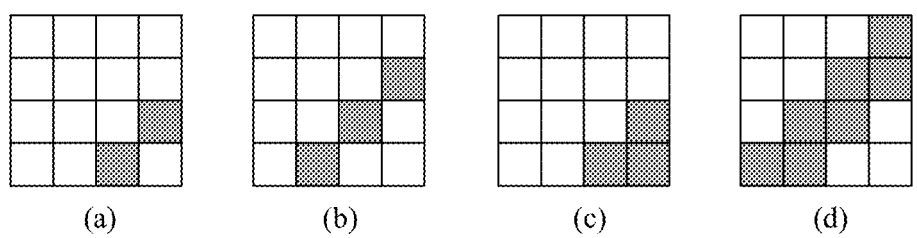
FIG. 9 is a schematic diagram of division of a specified region according to some embodiments.

Additionally, the specified region may be locations in the quantization coefficient block on at least one diagonal line. As shown in FIG. 9, if it is assumed that the quantization coefficient block is a 4×4 coefficient block and each square represents a quantization coefficient, locations on one diagonal line may be used as the specified region, as shown in (a)

and (b) in FIG. 9, or locations on two diagonal lines may be used as the specified region, as shown in (c) and (d) in FIG. 9.

In an example embodiment, the specified region may be an SRCC region in the quantization coefficient block. The SRCC region is a to-be-scanned region marked by using an SRCC technology.

Further, the specified region may be one or more specified locations in the SRCC region. The one or more specified locations in the SRCC region may include first N locations in a scan order, N being a natural number other than 0.

In some embodiments, the specified region may be at least one specified row in the SRCC region. As shown in FIG. 7, if it is assumed that the SRCC region is a 4×4 coefficient block and each square represents a quantization coefficient, one row of gray regions may be used as the specified region, as shown in (a) in FIG. 7, or two rows of gray regions may be used as the specified region, as shown in (b) in FIG. 7. The at least one row may be an upper row in the SRCC region in the quantization coefficient block.

The specified region may be at least one specified column in the SRCC region. As shown in FIG. 7, if it is assumed that the SRCC region is a 4×4 coefficient block and each square represents a quantization coefficient, one column of gray regions may be used as the specified region, as shown in (c) in FIG. 7, or two columns of gray regions may be used as the specified region, as shown in (d) in FIG. 7. The at least one column may be a left column in the SRCC region in the quantization coefficient block.

Further, the specified region may be at least one specified row and at least one specified column in the SRCC region. As shown in FIG. 8, if it is assumed that the SRCC region is a 4×4 coefficient block and each square represents a quantization coefficient, one lower row and one right column (that is, the gray regions) may be used as the specified region, as shown in (a) in FIG. 8, or two lower rows and two right columns (that is, the gray regions) may be used as the specified region, as shown in (b) in FIG. 8, one upper row and one left column (that is, the gray regions) may be used as the specified region, as shown in (c) in FIG. 8, or two upper rows and two left columns (that is, the gray regions) may be used as the specified region, as shown in (d) in FIG. 8.

In some embodiments, the specified region may be locations in the SRCC region on at least one diagonal line. As shown in FIG. 9, if it is assumed that the SRCC region is a 4×4 coefficient block and each square represents a quantization coefficient, locations on one diagonal line may be used as the specified region, as shown in (a) and (b) in FIG. 9, or locations on two diagonal lines may be used as the specified region, as shown in (c) and (d) in FIG. 9.

Additionally, the specified region division manners in the above embodiment may be combined, and a combined region is used as the specified region.

Operation S630: Determine, according to the quantization coefficient statistics value, whether to skip an inverse transform process.

It may be determined according to a parity of the quantization coefficient statistics value whether to skip the inverse transform process. For example, it is determined to skip the inverse transform process in a case that the quantization coefficient statistics value is an odd number, and it is determined to perform the inverse transform process in a case that the quantization coefficient statistics value is an even number. Alternatively, it is determined to perform the inverse transform process in a case that the quantization coefficient statistics value is an odd number, and it is determined to skip the inverse transform process in a case that the quantization coefficient statistics value is an even number.

It may be determined according to a magnitude of the quantization coefficient statistics value whether to skip the inverse transform process. For example, it is determined to skip the inverse transform process in a case that the quantization coefficient statistics value belongs to a first value set, and it is determined to perform the inverse transform process in a case that the quantization coefficient statistics value does not belong to the first value set. Alternatively, it is determined to skip the inverse transform process in a case that the quantization coefficient statistics value belongs to a first value set, and it is determined to perform the inverse transform process in a case that the quantization coefficient statistics value does not belong to the first value set. The first value set is set according to experience, or is flexibly adjusted according to an application scenario. For example, the first value set is (0, 2, 4, 6, 8, 10).

In an example embodiment, it is assumed that it is determined to skip the inverse transform process when the quantization coefficient statistics value belongs to the first value set and it is determined to perform the inverse transform process when the quantization coefficient statistics value does not belong to the first value set. In addition, it is assumed that the quantization coefficient statistics value is a remainder of the calculated result of the quantization coefficients for 4 (which is merely an example), and the first value set is (0, 1, 2). Therefore, when the quantization coefficient statistics value is 2, it is determined to skip the inverse transform process. When the quantization coefficient statistics value is 3, it is determined to perform the inverse transform process.

Similarly, it is assumed that it is determined to perform the inverse transform process when the quantization coefficient statistics value belongs to the first value set and it is determined to skip the inverse transform process when the quantization coefficient statistics value does not belong to the first value set. In addition, it is assumed that the quantization coefficient statistics value is a remainder of the calculated result of the quantization coefficients for 4 (which is merely an example), and the first value set is (0, 1, 2). Therefore, when the quantization coefficient statistics value is 2, it is determined to perform the inverse transform process. When the quantization coefficient statistics value is 3, it is determined to skip the inverse transform process.

In an example embodiment, if it is determined to skip the inverse transform process, an inverse quantization process is directly performed on the quantization coefficient block, and a result of the inverse quantization process is used as reconstructed residual data. If it is determined to perform the inverse transform process, inverse quantization is first performed on the quantization coefficient block, and then the inverse transform process is performed on a result of the inverse quantization based on a transform matrix combination used during coding of the coding block, to obtain reconstructed residual data. Optionally, a transform matrix combination used during the inverse transform may be any one of (DCT2, DCT2), (DCT8, DCT8), (DCT8, DST7), (DST7, DCT8), or (DST7, DST7).

Whether the coder end skips the transform process can be implicitly indicated by using the quantization coefficients in the quantization coefficient block, so that the decoder end can determine whether to perform an inverse transform process, which avoids coding of a transform skip flag for each CU by the coder end, thereby effectively improving video coding efficiency.

Figure 10:
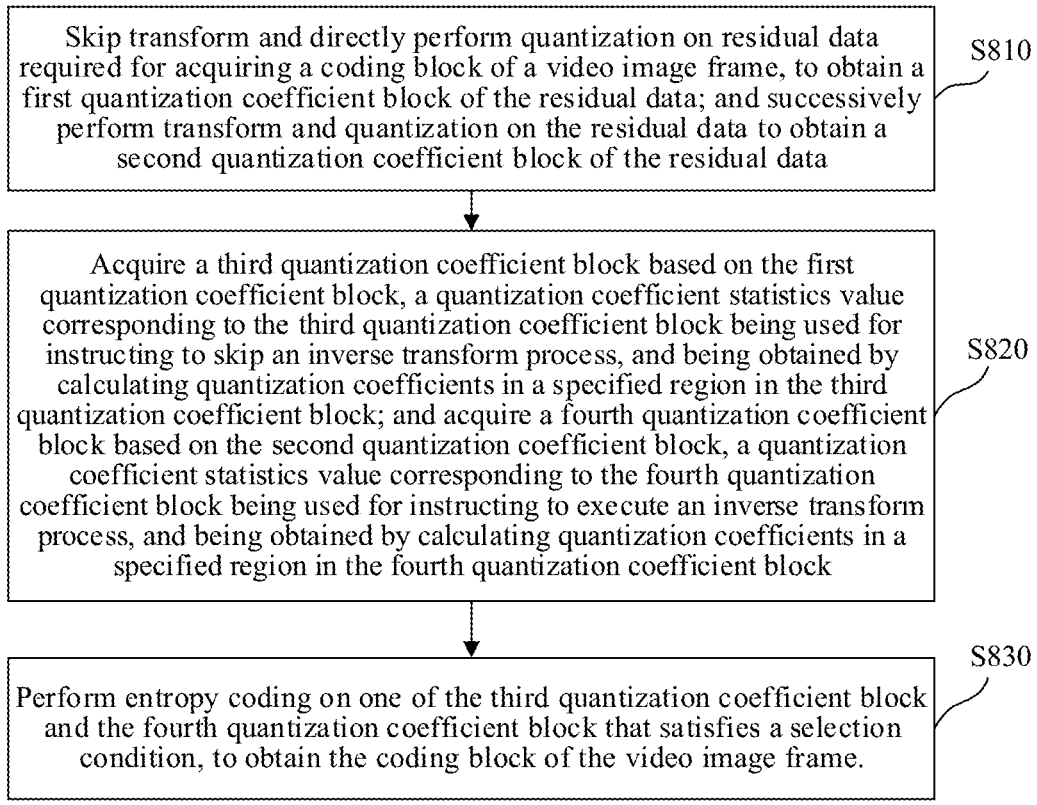
FIG. 10 is a flowchart of a video coding method according to some embodiments.

FIG. 10 is a flowchart of a video coding method according to some embodiments. The video coding method is performed by an electronic device. The electronic device is a device with a computing processing function, such as a terminal device or a server. The video coding method includes at least operations S810 to S830, which are described in detail as follows:

Operation S810: Skip transform and directly perform quantization on residual data required for acquiring a coding block of a video image frame, to obtain a first quantization coefficient block of the residual data; and successively perform transform and quantization on the residual data to obtain a second quantization coefficient block of the residual data.

During video coding, the quantization coefficient block of the residual data is obtained by skipping transform processing or without skipping transform processing. A suitable manner is selected for obtaining the final quantization coefficient block. In an example embodiment, the residual data is processed in a manner of skipping the transform process (that is, skipping transform and directly performing quantization), to obtain the first quantization coefficient block of the residual data, and the residual data is processed in a manner without skipping the transform process (that is, performing transform and quantization successively), to obtain the second quantization coefficient block of the residual data.

Operation S820: Acquire a third quantization coefficient block based on the first quantization coefficient block, a quantization coefficient statistics value corresponding to the third quantization coefficient block being used for instructing to skip an inverse transform process, and being obtained by calculating quantization coefficients in a specified region in the third quantization coefficient block; and acquire a fourth quantization coefficient block based on the second quantization coefficient block, a quantization coefficient statistics value corresponding to the fourth quantization coefficient block being used for instructing to perform an inverse transform process, and being obtained by calculating quantization coefficients in a specified region in the fourth quantization coefficient block.

In order to use the quantization coefficients in the quantization coefficient block to implicitly indicate whether the transform process is skipped, different characteristics are required to be assigned to the quantization coefficient block obtained by skipping the transform processing and the quantization coefficient block obtained without skipping the transform processing. In some embodiments, the characteristic assigned to the quantization coefficient block obtained by skipping the transform processing is that the quantization coefficient statistics value corresponding to the quantization coefficient block is used for instructing to skip the inverse transform process. The characteristic assigned to the quantization coefficient block obtained without skipping the transform processing is that the quantization coefficient statistics value corresponding to the quantization coefficient block is used for instructing to perform the inverse transform process. For a manner of acquiring the quantization coefficient statistics value corresponding to the quantization coefficient block and a manner of determining whether the quantization coefficient statistics value is used for instructing to skip the inverse transform process, refer to the details shown in FIG. 6. The details are not repeated herein.

In some embodiments, a process of acquiring the third quantization coefficient block based on the first quantization coefficient block includes: using the first quantization coefficient block as the third quantization coefficient block in response to a quantization coefficient statistics value corresponding to the first quantization coefficient block being used for instructing to skip the inverse transform process; and adjusting one or more quantization coefficients in the first quantization coefficient block so that the quantization coefficient statistics value corresponding to the adjusted quantization coefficient block is used for instructing to skip the inverse transform process in response to the quantization coefficient statistics value corresponding to the first quantization coefficient block being used for instructing to perform the inverse transform process, and using the adjusted quantization coefficient block as the third quantization coefficient block. A manner of adjusting the one or more quantization coefficients in the first quantization coefficient block so that the quantization coefficient statistics value corresponding to the adjusted quantization coefficient block is used for instructing to skip the inverse transform process is configured according to experience, or is flexibly adjusted according to an application scenario.

In an example embodiment, it is assumed that the quantization coefficient statistics value being used for instructing to skip the inverse transform process means that the quantization coefficient statistics value is an odd number. If the quantization coefficient statistics value corresponding to the first quantization coefficient block is an even number, the manner of adjusting the one or more quantization coefficients in the first quantization coefficient block so that the quantization coefficient statistics value corresponding to the adjusted quantization coefficient block is used for instructing to skip the inverse transform process may be: increasing or reducing a value of any one of the quantization coefficients in the first quantization coefficient block by 1.

In some embodiments, a process of acquiring the fourth quantization coefficient block based on the second quantization coefficient block includes: using the second quantization coefficient block as the fourth quantization coefficient block in response to a quantization coefficient statistics value corresponding to the second quantization coefficient block being used for instructing to perform the inverse transform process; and adjusting one or more quantization coefficients in the second quantization coefficient block so that the quantization coefficient statistics value corresponding to the adjusted quantization coefficient block is used for instructing to perform the inverse transform process in response to the quantization coefficient statistics value corresponding to the second quantization coefficient block being used for instructing to skip the inverse transform process, and using the adjusted quantization coefficient block as the fourth quantization coefficient block. A manner of adjusting the one or more quantization coefficients in the second quantization coefficient block so that the quantization coefficient statistics value corresponding to the adjusted quantization coefficient block is used for instructing to perform the inverse transform process is configured according to experience, or is flexibly adjusted according to an application scenario.

In an example embodiment, it is assumed that the quantization coefficient statistics value being used for instructing to perform the inverse transform process means that the quantization coefficient statistics value is an odd number. If the quantization coefficient statistics value corresponding to the second quantization coefficient block is an odd number, the manner of adjusting the one or more quantization coefficients in the second quantization coefficient block so that the quantization coefficient statistics value corresponding to the adjusted quantization coefficient block is used for instructing to perform the inverse transform process may be:

increasing or reducing a value of any one of the quantization coefficients in the second quantization coefficient block by 1.

Operation S830: Perform entropy coding on one of the third quantization coefficient block and the fourth quantization coefficient block that satisfies a selection condition, to obtain the coding block of the video image frame.

After the third quantization coefficient block and the fourth quantization coefficient block are obtained, entropy coding is performed on one of the third quantization coefficient block and the fourth quantization coefficient block that satisfies the selection condition. For example, which one of the third quantization coefficient block and the fourth quantization coefficient block satisfies the selection condition may be determined through RDO. Exemplarily, one of the third quantization coefficient block and the fourth quantization coefficient block with relatively low coding costs is used as the quantization coefficient block that satisfies the selection condition.

After the entropy coding is performed on the quantization coefficient block that satisfies the selection condition, the coding block of the video image frame is obtained.

In an example embodiment, since the quantization coefficients in both of the third quantization coefficient block and the fourth quantization coefficient block can be used for determination as to whether to skip the inverse transform process, regardless of whether the third quantization coefficient block or the fourth quantization coefficient block satisfies the selection condition, it is considered that determination as to whether to skip an inverse transform process for an obtained coding block needs to be made according to quantization coefficients in a quantization coefficient block obtained through entropy decoding. For example, a manner of determining whether determination as to whether to skip an inverse transform process for a coding block needs to be made according to quantization coefficients in a quantization coefficient block obtained through entropy decoding is created at the coder end, and the determination manner is synchronized to the decoder end. In this way, the decoder end can determine whether determination as to whether to skip the inverse transform process for the coding block needs to be made according to the quantization coefficients in the quantization coefficient block obtained through entropy decoding. For the manner of determining whether determination as to whether to skip an inverse transform process for a coding block needs to be made according to quantization coefficients in a quantization coefficient block obtained through entropy decoding, refer to the details shown in FIG. 6, and the details are not described herein.

If the quantization coefficient statistics value corresponding to the quantization coefficient block obtained through entropy decoding of the coding block is used for instructing to skip the inverse transform process, it indicates that the third quantization coefficient block satisfies the selection condition. Since the third quantization coefficient block is obtained based on the first quantization coefficient block, and the first quantization coefficient block is obtained by skipping the transform process, it may be determined that during decoding of the quantization coefficient block, the inverse transform process needs to be skipped. If the quantization coefficient statistics value corresponding to the quantization coefficient block obtained through entropy decoding of the coding block is used for instructing to perform the inverse transform process, it indicates that the fourth quantization coefficient block satisfies the selection condition. Since the fourth quantization coefficient block is obtained based on the second quantization coefficient block, and the second quantization coefficient block is obtained without skipping the transform process, it may be determined that during decoding of the quantization coefficient block, the inverse transform process needs to be performed.

Whether the coder end skips the transform process can be implicitly indicated by using the quantization coefficients in the quantization coefficient block, which avoids coding of a transform skip flag for each CU by the coder end, thereby effectively improving video coding efficiency.

An embodiment of the disclosure provides a video processing system. The video processing system includes a video coding apparatus and a video decoding apparatus. The video coding apparatus is configured to perform the video coding method in the embodiment shown in FIG. 10. The video decoding apparatus is configured to perform the video decoding method in the embodiment shown in FIG. 6.

Some apparatus embodiments are described below, which can be used to perform the video decoding method and the video coding method in the above embodiments. For details not disclosed in the apparatus embodiments, refer to the above embodiments of the video decoding method and the video coding method as described above.

Figure 11:
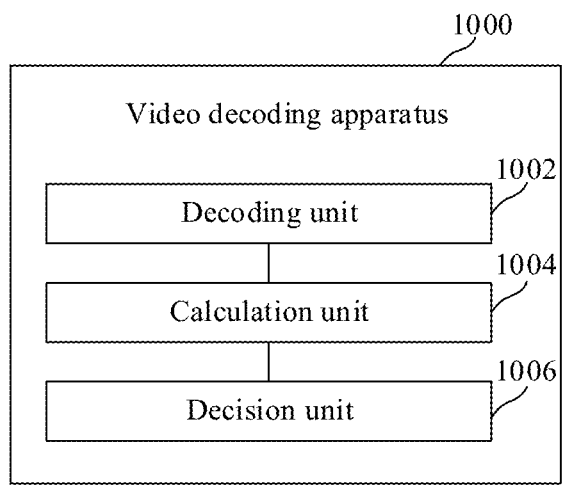
FIG. 11 is a block diagram of a video decoding apparatus according to some embodiments.

FIG. 11 is a block diagram of a video decoding apparatus according to some embodiments. The video decoding apparatus may be arranged in a device with a computing and processing function, such as a terminal device or a server.

Referring to FIG. 11, a video decoding apparatus 1000 according to some embodiments includes a decoding unit 1002, a calculation unit 1004, and a decision unit 1006.

The decoding unit 1002 is configured to perform entropy decoding on a coding block of a video image frame to obtain a quantization coefficient block of residual data corresponding to the coding block. The calculation unit 1004 is configured to calculate quantization coefficients in a specified region in the quantization coefficient block to obtain a quantization coefficient statistics value. The decision unit 1006 is configured to determine, according to the quantization coefficient statistics value, whether to skip an inverse transform process.

In some embodiments, based on the above solution, the calculation unit 1004 is configured to calculate the quantization coefficients in the specified region in the quantization coefficient block in response to determining that determination as to whether to skip the inverse transform process needs to be made according to the quantization coefficients in the quantization coefficient block.

The video decoding apparatus 1000 may further include: a first determining unit, configured to determine that determination as to whether to skip an inverse transform process for all coding blocks in first coded data corresponding to a video image frame sequence needs to be made according to quantization coefficients in a quantization coefficient block obtained through entropy decoding in a case that a sequence header of the first coded data includes a specified index identifier.

Additionally, the video decoding apparatus 1000 may further include: a second determining unit, configured to determine that determination as to whether to skip an inverse transform process for all coding blocks in second coded data corresponding to a video image frame needs to be made according to quantization coefficients in a quantization coefficient block obtained through entropy decoding in a case that an image header of the second coded data includes a specified index identifier.

The video decoding apparatus 1000 may further include: a third determining unit, configured to determine that determination as to whether to skip an inverse transform process for all coding blocks in third coded data corresponding to a slice of the video image frame needs to be made according to quantization coefficients in a quantization coefficient block obtained by entropy decoding in a case that a slice header of the third coded data includes a specified index identifier.

In some embodiments, the video decoding apparatus 1000 may further include: a fourth determining unit, configured to determine that determination as to whether to skip an inverse transform process for all coding blocks in fourth coded data corresponding to an LCU of a video image frame needs to be made according to quantization coefficients in a quantization coefficient block obtained by entropy decoding in a case that an LCU header of the fourth coded data includes a specified index identifier.

The video decoding apparatus 1000 may further include: a fifth determining unit, configured to determine, according to a relationship between sizes of the coding blocks and a reference threshold range, whether determination as to whether to skip the inverse transform process for the coding blocks needs to be made according to the quantization coefficients in the quantization coefficient block obtained through entropy decoding.

In some embodiments, the video decoding apparatus 1000 may further include: a sixth determining unit, configured to determine that determination as to whether to skip an inverse transform process for all coding blocks in first coded data corresponding to a video image frame sequence does not need to be made according to quantization coefficients in a quantization coefficient block obtained through entropy decoding in a case that an index identifier included in a sequence header of the first coded data is a first value.

Additionally, the sixth determining unit is further configured to determine that determination as to whether to skip an inverse transform process for all coding blocks in second coded data corresponding to a video image frame in a video image frame sequence does not need to be made according to quantization coefficients in a quantization coefficient block obtained through entropy decoding in a case that an index identifier included in a sequence header of the first coded data corresponding to the video image frame sequence is a second value and an index identifier included in an image header of the second coded data is a first value.

The sixth determining unit may be further configured to determine that determination as to whether to skip the inverse transform process for all of the coding blocks in the second coded data needs to be made according to the quantization coefficients in the quantization coefficient block obtained through entropy decoding in a case that the index identifier included in the sequence header is the second value and the index identifier included in the image header is the second value.

Additionally, the sixth determining unit may be further configured to determine that determination as to whether to skip an inverse transform process for all coding blocks in third coded data corresponding to a slice of the video image frame does not need to be made according to quantization coefficients in a quantization coefficient block obtained through entropy decoding in a case that the index identifier included in the sequence header is the second value, the index identifier included in the image header is the second value, and an index identifier included in a slice header of the third coded data is the first value.

The sixth determining unit may be further configured to determine that determination as to whether to skip the inverse transform process for all of the coding blocks in the third coded data needs to be made according to the quantization coefficients in the quantization coefficient block obtained through entropy decoding in a case that the index identifier included in the sequence header is the second value, the index identifier included in the image header is the second value, and the index identifier included in the slice header is the second value.

In some embodiments, the sixth determining unit may be further configured to determine that determination as to whether to skip an inverse transform process for all coding blocks in fourth coded data corresponding to an LCU of the slice does not need to be made according to quantization coefficients in a quantization coefficient block obtained through entropy decoding in a case that the index identifier included in the sequence header is the second value, the index identifier included in the image header is the second value, the index identifier included in the slice header is the second value, and an index identifier included in an LCU header of the fourth coded data is the first value.

The sixth determining unit may be further configured to determine that determination as to whether to skip the inverse transform process for all of the coding blocks in the fourth coded data needs to be made according to the quantization coefficients in the quantization coefficient block obtained by entropy decoding in a case that the index identifier included in the sequence header is the second value, the index identifier included in the image header is the second value, the index identifier included in the slice header is the second value, and the index identifier included in the LCU header is the second value.

Additionally, sixth determining unit may be further configured to determine, according to a relationship between sizes of coding blocks in the LCU and a reference threshold range, whether determination as to whether to skip the inverse transform process for the coding blocks needs to be made according to the quantization coefficients in the quantization coefficient block obtained through entropy decoding in a case that the index identifier included in the sequence header is the second value, the index identifier included in the image header is the second value, the index identifier included in the slice header is the second value, and the index identifier included in the LCU header is the second value.

In some embodiments, the calculation unit 1004 may be configured to: calculate the quantization coefficients in the specified region according to values of the quantization coefficients in the specified region in the quantization coefficient block to obtain a calculated result, and use the calculated result as the quantization coefficient statistics value; or calculate the quantization coefficients in the specified region according to values of the quantization coefficients in the specified region in the quantization coefficient block to obtain a calculated result, calculate a remainder of the calculated result for a specified value, and use the remainder as the quantization coefficient statistics value.

Additionally, the calculation unit 1004 may be configured to: calculate a sum of the values of the quantization coefficients in the specified region according to the values of the quantization coefficients in the specified region, and use the obtained sum as the calculated result; or calculate a sum of absolute values of the quantization coefficients in the specified region according to the values of the quantization coefficients in the specified region in the quantization coefficient block, and use the obtained sum as the calculated result; or convert values of odd-valued quantization coefficients in the specified region to first values and values of even-valued quantization coefficients in the specified region to second values according to the values of the quantization coefficients in the specified region, calculate a sum of the values of the quantization coefficients in the specified region after conversion of the values, and use the obtained sum as the calculated result, one of the first values and the second values being an odd number, and the other thereof being an even number.

Further, in some embodiments, the calculation unit 1004 may be configured to: calculate a number of odd-valued quantization coefficients in the specified region according to the values of the quantization coefficients in the specified region, and use the obtained number as the calculated result; or calculate a sum of values of odd-valued quantization coefficients in the specified region according to the values of the quantization coefficients in the specified region, and use the obtained sum as the calculated result; or calculate a sum of absolute values of odd-valued quantization coefficients in the specified region according to the values of the quantization coefficients in the specified region, and use the obtained number as the calculated result; or convert values of odd-valued quantization coefficients in the specified region to first values and values of even-valued quantization coefficients in the specified region to second values according to the values of the quantization coefficients in the specified region, calculate a sum of the odd values of the quantization coefficients in the specified region after conversion of the values, and use the obtained sum as the calculated result, one of the first values and the second values being an odd number, and the other thereof being an even number.

The calculation unit 1004 may be configured to: calculate a number of even-valued quantization coefficients in the specified region according to the values of the quantization coefficients in the specified region, and using the obtained number as the calculated result; or calculate a sum of values of even-valued quantization coefficients in the specified region according to the values of the quantization coefficients in the specified region, and use the obtained sum as the calculated result; or calculate a sum of absolute values of even-valued quantization coefficients in the specified region according to the values of the quantization coefficients in the specified region, and use the obtained number as the calculated result; or convert values of odd-valued quantization coefficients in the specified region to first values and values of even-valued quantization coefficients in the specified region to second values according to the values of the quantization coefficients in the specified region, calculate a sum of the even values of the quantization coefficients in the specified region after conversion of the values, and use the obtained sum as the calculated result, one of the first values and the second values being an odd number, and the other thereof being an even number.

In some embodiments, the specified region may include any one of the following:

all regions in the quantization coefficient block;

one or more specified locations in the quantization coefficient block;

at least one specified row in the quantization coefficient block;

at least one specified column in the quantization coefficient block;

at least one specified row and at least one specified column in the quantization coefficient block; or locations in the quantization coefficient block on at least one diagonal line.

Additionally, in some embodiments, the specified region may include any one of the following:

an SRCC region in the quantization coefficient block;

one or more specified locations in the SRCC region;

at least one specified row in the SRCC region;

at least one specified column in the SRCC region;

at least one specified row and at least one specified column in the SRCC region; or a location in the SRCC region on at least one diagonal line.

The one or more specified locations in the SRCC region may include first N locations in a scan order, N being a natural number other than 0.

In some embodiments, the decision unit 1006 may be configured to: determine to skip the inverse transform process in a case that the quantization coefficient statistics value is an odd number, and determine to perform the inverse transform process in a case that the quantization coefficient statistics value is an even number; or determine to perform the inverse transform process in a case that the quantization coefficient statistics value is an odd number, and determine to skip the inverse transform process in a case that the quantization coefficient statistics value is an even number.

The decision unit 1006 may be further configured to: determine to skip the inverse transform process in a case that the quantization coefficient statistics value belongs to a first value set, and determine to perform the inverse transform process in a case that the quantization coefficient statistics value does not belong to the first value set; or determine to perform the inverse transform process in a case that the quantization coefficient statistics value belongs to the first value set, and determine to skip the inverse transform process in a case that the quantization coefficient statistics value does not belong to the first value set.

Figure 12:
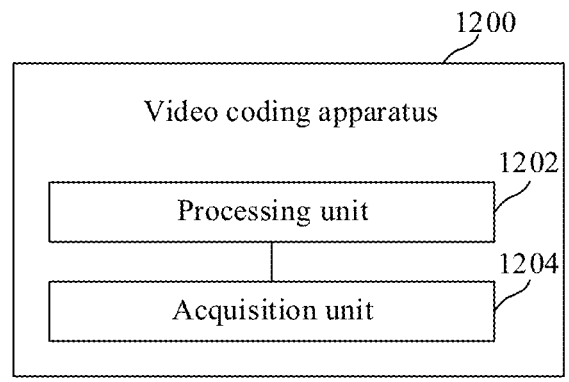
FIG. 12 is a block diagram of a video coding apparatus according to some embodiments.

FIG. 12 is a block diagram of a video coding apparatus according to some embodiments. The video coding apparatus may be arranged in an electronic device with a computing and processing function, such as a terminal device or a server.

Referring to FIG. 12, a video coding apparatus 1200 according to some embodiments includes a processing unit 1202 and an acquisition unit 1204.

The processing unit 1202 is configured to skip transform and directly perform quantization on residual data required for acquiring a coding block of a video image frame, to obtain a first quantization coefficient block of the residual data; and successively perform transform and quantization on the residual data to obtain a second quantization coefficient block of the residual data.

The acquisition unit 1204 is configured to: acquire a third quantization coefficient block based on the first quantization coefficient block, a quantization coefficient statistics value corresponding to the third quantization coefficient block being used for instructing to skip an inverse transform process, and being obtained by calculating quantization coefficients in a specified region in the third quantization coefficient block; and acquire a fourth quantization coefficient block based on the second quantization coefficient block, a quantization coefficient statistics value corresponding to the fourth quantization coefficient block being used for instructing to perform an inverse transform process, and being obtained by calculating quantization coefficients in a specified region in the fourth quantization coefficient block.

The processing unit 1202 may be further configured to perform entropy coding on one of the third quantization coefficient block and the fourth quantization coefficient block that satisfies a selection condition, to obtain the coding block of the video image frame.

Figure 13:
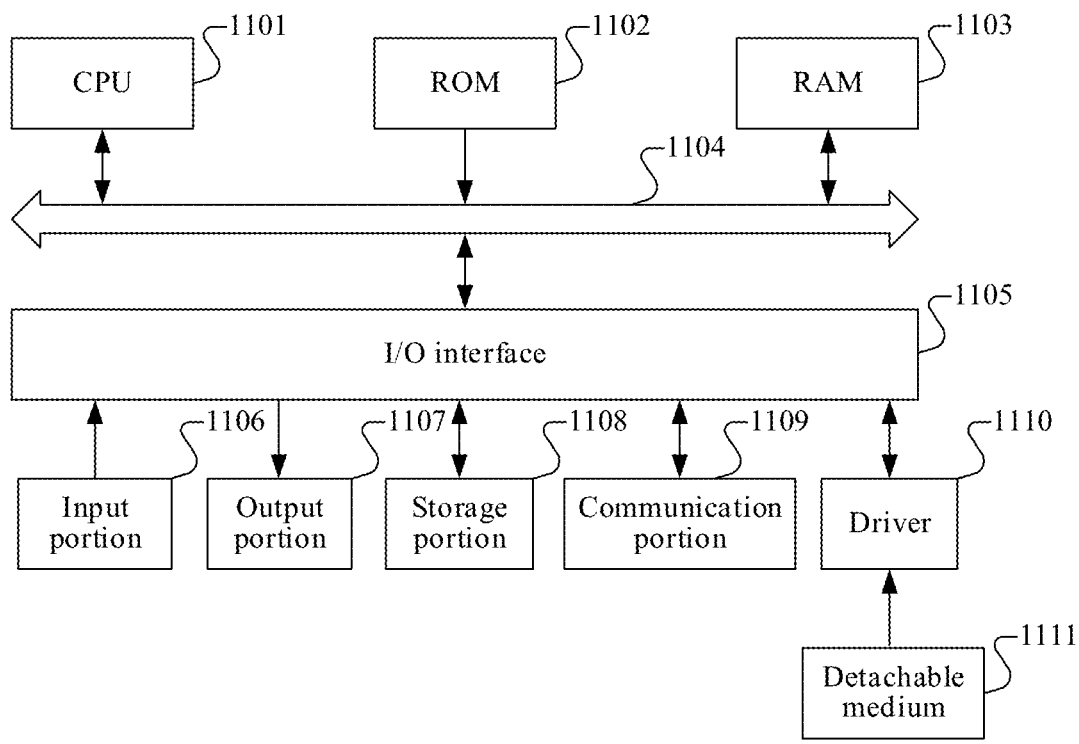
FIG. 13 is a schematic structural diagram of a computer system adapted to implement an electronic device according to some embodiments.

FIG. 13 is a schematic structural diagram of a computer system adapted to implement an electronic device according to some embodiments.

The computer system 1100 of the electronic device shown in FIG. 13 is merely an example, and does not constitute any limitation on functions and use ranges of the embodiments of the disclosure.

As shown in FIG. 13, the computer system 1100 includes a central processing unit (CPU) 1101, which may perform various suitable actions and processing based on a program stored in a read-only memory (ROM) 1102 or a program loaded from a storage part 1108 into a random access memory (RAM) 1103, for example, perform the method described in the foregoing embodiments. The RAM 1103 further stores various programs and data required for system operations. The CPU 1101, the ROM 1102, and the RAM 1103 are connected to each other by using a bus 1104. An input/output (I/O) interface 1105 is also connected to the bus 1104.

The following components are connected to the I/O interface 1105: an input part 1106 including a keyboard, a mouse, and the like; an output part 1107 including a cathode ray tube (CRT), a liquid crystal display (LCD), a speaker, and the like; a storage part 1108 including a hard disk and the like; and a communication part 1109 including a network interface card such as a local area network (LAN) card, a modem, and the like. The communication part 1109 performs communication processing by using a network such as the Internet. A driver 1110 is also connected to the I/O interface 1105 as needed. A removable medium 1111, such as a magnetic disk, an optical disc, a magneto-optical disk, or a semiconductor memory, is installed on the drive 1110 as required, so that a computer program read from the removable medium is installed into the storage part 1108 as required.

The processes described above by referring to the flowcharts may be implemented as computer software programs. For example, some embodiments include a computer program product. The computer program product includes a computer program stored in a computer-readable medium. The computer program includes a computer program used for performing a method shown in the flowchart. In such an embodiment, the computer program may be downloaded from a network via the communication portion 1109 and installed, and/or installed from the removable medium 1111. When the computer program is executed by the CPU 1101, the various functions defined in the system are executed.

The computer-readable medium shown in some embodiments may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disc read-only memory (CD-ROM), an optical storage device, a magnetic storage device, or any appropriate combination thereof.

The computer-readable storage medium may be any tangible medium containing or storing a program, and the program may be used by or used in combination with an instruction execution system, apparatus, or device. Additionally, the computer-readable signal medium may include a data signal in a baseband or propagated as a part of a carrier, which carries the computer-readable computer program. The computer-readable storage medium may be any tangible medium containing or storing a program, and the program may be used by or used in combination with an instruction execution system, apparatus, or device. The computer-readable signal medium may alternatively be any computer-readable medium other than the computer-readable storage medium. The computer readable medium may be configured to send, propagate, or transmit a program used by or in combination with an instruction execution system, apparatus, or device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of the disclosure. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Related units described in the embodiments of the disclosure may be implemented in a software manner, or may be implemented in a hardware manner, and the unit described can also be set in a processor. Names of the units do not constitute a limitation on the units in a specific case.

According to another aspect, a computer-readable medium may be provided. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. The features and functions of two or more modules or units described above may be specifically implemented in one module or unit. Conversely, features and functions of one module or unit described above may be further divided into a plurality of modules or units.

According to the foregoing descriptions, a person skilled in the art may readily understand that the example embodiments described herein may be implemented by using software, or may be implemented by combining software and necessary hardware. Therefore, the technical solutions may be implemented in a form of a software product. The software product may be stored in a non-volatile storage medium (which may be a CD-ROM, a USB flash drive, a removable hard disk, or the like), non-transitory storage medium, or on a network, including several instructions for instructing a computing device (which may be a personal computer, a server, a touch terminal, a network device, or the like) to perform the methods according to the implementations the disclosure.

After considering the specification and practicing the disclosed implementations, a person skilled in the art may easily conceive of other implementations of the disclosure. This disclosure is intended to cover any variations, uses, or adaptive changes of the disclosure following the general principles of the disclosure, and includes well-known knowledge and conventional technical means in the art and undisclosed above.

It is to be understood that the disclosure is not limited to the precise structures described above and shown in the accompanying drawings, and various modifications and changes may be made without departing from the scope of the present disclosure.

What is claimed is:

1. A video decoding method, performed by an electronic device, comprising:
   performing entropy decoding on a coding block of a video image frame to obtain a quantization coefficient block of residual data corresponding to the coding block;
   calculating quantization coefficients in a specified region in the quantization coefficient block to obtain a quantization coefficient statistics value, the specified region corresponding to a subset of the coding block; and
   determining, according to the quantization coefficient statistics value, whether to skip an inverse transform process,
   wherein the calculating quantization coefficients in the specified region to determine whether to skip the inverse transform process comprises calculating values of the quantization coefficients in the specified region to obtain the coefficient statistics value, and
   wherein the calculating quantization coefficients in the specified region further comprises calculating the quantization coefficients in the specified region according to values of the quantization coefficients in the specified region in the quantization coefficient block to obtain the quantization coefficient statistics value,
   wherein the quantization coefficient statistics value is a remainder of the calculated result of the quantization coefficients, and
   wherein it is determined to skip the inverse transform process in response to determining that the quantization coefficient statistics value belongs to a first value set.

2. The video decoding method according to claim 1, wherein the calculating comprises:
   calculating the quantization coefficients in the specified region in the quantization coefficient block in response to determining that determination as to whether to skip the inverse transform process needs to be made according to the quantization coefficients in the quantization coefficient block.

3. The video decoding method according to claim 2, further comprising:
   determining that a determination as to whether to skip an inverse transform process for all coding blocks in first coded data corresponding to a video image frame sequence needs to be made according to quantization coefficients in a quantization coefficient block obtained through entropy decoding in a case that a sequence header of the first coded data comprises a specified index identifier; or
   determining that a determination as to whether to skip an inverse transform process for all coding blocks in second coded data corresponding to a video image frame needs to be made according to quantization coefficients in a quantization coefficient block obtained through entropy decoding in a case that an image header of the second coded data comprises a specified index identifier; or
   determining that a determination as to whether to skip an inverse transform process for all coding blocks in third coded data corresponding to a slice of the video image frame needs to be made according to quantization coefficients in a quantization coefficient block obtained through entropy decoding in a case that a slice header of the third coded data comprises a specified index identifier; or
   determining that a determination as to whether to skip an inverse transform process for all coding blocks in fourth coded data corresponding to a largest coding unit (LCU) of a video image frame needs to be made according to quantization coefficients in a quantization coefficient block obtained through entropy decoding in a case that an LCU header of the fourth coded data comprises a specified index identifier; or
   determining, according to a relationship between sizes of the coding blocks and a reference threshold range, whether a determination as to whether to skip the inverse transform process for the coding blocks needs to be made according to the quantization coefficients in the quantization coefficient block obtained through entropy decoding.

4. The video decoding method according to claim 2, further comprising:
   determining that a determination as to whether to skip an inverse transform process for all coding blocks in first coded data corresponding to a video image frame sequence does not need to be made according to quantization coefficients in a quantization coefficient block obtained through entropy decoding in a case that an index identifier comprised in a sequence header of the first coded data is a first value.

5. The video decoding method according to claim 2, further comprising:
   determining that a determination as to whether to skip an inverse transform process for all coding blocks in second coded data corresponding to a video image frame in a video image frame sequence does not need to be made according to quantization coefficients in a quantization coefficient block obtained through entropy decoding in a case that an index identifier comprised in a sequence header of the first coded data corresponding to the video image frame sequence is a second value and an index identifier comprised in an image header of the second coded data is a first value.

6. The video decoding method according to claim 5, further comprising:

determining that a determination as to whether to skip the inverse transform process for all of the coding blocks in the second coded data needs to be made according to the quantization coefficients in the quantization coefficient block obtained through entropy decoding in a case that the index identifier comprised in the sequence header is the second value and the index identifier comprised in the image header is the second value.

7. The video decoding method according to claim 5, further comprising:
determining that a determination as to whether to skip an inverse transform process for all coding blocks in third coded data corresponding to a slice of the video image frame does not need to be made according to quantization coefficients in a quantization coefficient block obtained through entropy decoding in a case that the index identifier comprised in the sequence header is the second value, the index identifier comprised in the image header is the second value, and an index identifier comprised in a slice header of the third coded data is the first value.

8. The video decoding method according to claim 7, further comprising:
determining that a determination as to whether to skip the inverse transform process for all of the coding blocks in the third coded data needs to be made according to the quantization coefficients in the quantization coefficient block obtained through entropy decoding in a case that the index identifier comprised in the sequence header is the second value, the index identifier comprised in the image header is the second value, and the index identifier comprised in the slice header is the second value.

9. The video decoding method according to claim 7, further comprising:
determining that a determination as to whether to skip an inverse transform process for all coding blocks in fourth coded data corresponding to an LCU of the slice does not need to be made according to quantization coefficients in a quantization coefficient block obtained through entropy decoding in a case that the index identifier comprised in the sequence header is the second value, the index identifier comprised in the image header is the second value, the index identifier comprised in the slice header is the second value, and an index identifier comprised in an LCU header of the fourth coded data is the first value.

10. The video decoding method according to claim 9, further comprising:
determining that a determination as to whether to skip the inverse transform process for all of the coding blocks in the fourth coded data needs to be made according to the quantization coefficients in the quantization coefficient block obtained through entropy decoding in a case that the index identifier comprised in the sequence header is the second value, the index identifier comprised in the image header is the second value, the index identifier comprised in the slice header is the second value, and the index identifier comprised in the LCU header is the second value.

11. The video decoding method according to claim 9, further comprising:
determining, according to a relationship between sizes of the coding blocks in the LCU and a reference threshold range, whether a determination as to whether to skip the inverse transform process for the coding blocks needs to be made according to the quantization coefficients in the quantization coefficient block obtained through entropy decoding in a case that the index identifier comprised in the sequence header is the second value, the index identifier comprised in the image header is the second value, the index identifier comprised in the slice header is the second value, and the index identifier comprised in the LCU header is the second value.

12. The video decoding method according to claim 1, wherein the calculating the quantization coefficients in the specified region according to values of the quantization coefficients in the specified region in the quantization coefficient block to obtain a calculated result comprises:
calculating a sum of the values of the quantization coefficients in the specified region according to the values of the quantization coefficients in the specified region, and using the obtained sum as the calculated result; or
calculating a sum of absolute values of the quantization coefficients in the specified region according to the values of the quantization coefficients in the specified region in the quantization coefficient block, and using the obtained sum as the calculated result; or
converting values of odd-valued quantization coefficients in the specified region to first values and values of even-valued quantization coefficients in the specified region to second values according to the values of the quantization coefficients in the specified region, calculating a sum of the values of the quantization coefficients in the specified region after conversion of the values, and using the obtained sum as the calculated result, one of the first values and the second values being an odd number, and the other thereof being an even number.

13. The video decoding method according to claim 1, wherein the calculating the quantization coefficients in the specified region according to values of the quantization coefficients in the specified region in the quantization coefficient block to obtain a calculated result comprises:
calculating a number of odd-valued quantization coefficients in the specified region according to the values of the quantization coefficients in the specified region, and using the obtained number as the calculated result; or
calculating a sum of values of odd-valued quantization coefficients in the specified region according to the values of the quantization coefficients in the specified region, and using the obtained sum as the calculated result; or
calculating a sum of absolute values of odd-valued quantization coefficients in the specified region according to the values of the quantization coefficients in the specified region, and using the obtained number as the calculated result; or
converting values of odd-valued quantization coefficients in the specified region to first values and values of even-valued quantization coefficients in the specified region to second values according to the values of the quantization coefficients in the specified region, calculating a sum of the odd values of the quantization coefficients in the specified region after conversion of the values, and using the obtained sum as the calculated result, one of the first values and the second values being an odd number, and the other thereof being an even number.

14. The video decoding method according to claim 1, wherein the calculating the quantization coefficients in the specified region according to values of the quantization coefficients in the specified region in the quantization coefficient block to obtain a calculated result comprises:

calculating a number of even-valued quantization coefficients in the specified region according to the values of the quantization coefficients in the specified region, and using the obtained number as the calculated result; or calculating a sum of values of even-valued quantization coefficients in the specified region according to the values of the quantization coefficients in the specified region, and using the obtained sum as the calculated result; or calculating a sum of absolute values of even-valued quantization coefficients in the specified region according to the values of the quantization coefficients in the specified region, and using the obtained number as the calculated result; or converting values of odd-valued quantization coefficients in the specified region to first values and values of even-valued quantization coefficients in the specified region to second values according to the values of the quantization coefficients in the specified region, calculating a sum of the even values of the quantization coefficients in the specified region after conversion of the values, and using the obtained sum as the calculated result, one of the first values and the second values being an odd number, and the other thereof being an even number.

15. The video decoding method according to claim 1, wherein the specified region comprises any one of the following:
   all regions in the quantization coefficient block;
   one or more specified locations in the quantization coefficient block;
   at least one specified row in the quantization coefficient block;
   at least one specified column in the quantization coefficient block;
   at least one specified row and at least one specified column in the quantization coefficient block; or
   locations in the quantization coefficient block on at least one diagonal line.

16. The video decoding method according to claim 1, wherein the specified region comprises any one of the following:
   a scan region-based coefficient coding (SRCC) region in the quantization coefficient block;
   one or more specified locations in the SRCC region;
   at least one specified row in the SRCC region;
   at least one specified column in the SRCC region;
   at least one specified row and at least one specified column in the SRCC region; or
   a location in the SRCC region on at least one diagonal line.

17. The video decoding method according to claim 16, wherein the one or more specified locations in the SRCC region comprise first N locations in a scan order, N being a natural number other than 0.

18. A video decoding apparatus, comprising:
   at least one memory configured to store program code; and
   at least one processor configured to read the program code and operate as instructed by the program code, the program code comprising:
   decoding code configured to cause the at least one processor to perform entropy decoding on a coding block of a video image frame to obtain a quantization coefficient block of residual data corresponding to the coding block;
   calculation code configured to cause the at least one processor to calculate quantization coefficients in a specified region in the quantization coefficient block to obtain a quantization coefficient statistics value, the specific region corresponding to a subset of the coding block; and
   decision code configured to cause the at least one processor to determine, according to the quantization coefficient statistics value, whether to skip an inverse transform process,
   wherein the calculation code is further configured to cause the at least one processor to:
   calculate quantization coefficients in the specified region to determine whether to skip the inverse transform process by calculating values of the quantization coefficients in the specified region to obtain the coefficient statistics value, and
   wherein the calculation of the quantization coefficients in the specified region further comprises calculating the quantization coefficients in the specified region according to values of the quantization coefficients in the specified region in the quantization coefficient block to obtain the quantization coefficient statistics value,
   wherein the quantization coefficient statistics value is a remainder of the calculated result of the quantization coefficients, and
   wherein it is determined to skip the inverse transform process in response to determining that the quantization coefficient statistics value belongs to a first value set.

19. A non-transitory computer-readable medium storing a computer program that when executed by at least one processor causes the at least one processor to:
   perform entropy decoding on a coding block of a video image frame to obtain a quantization coefficient block of residual data corresponding to the coding block;
   calculate quantization coefficients in a specified region in the quantization coefficient block to obtain a quantization coefficient statistics value, the specified region corresponding to a subset of the coding block; and
   determine, according to the quantization coefficient statistics value, whether to skip an inverse transform process,
   wherein the calculate quantization coefficients in the specified region to determine whether to skip the inverse transform process comprises calculating values of the quantization coefficients in the specified region to obtain the coefficient statistics value, and
   wherein the calculate of the quantization coefficients in the specified region further comprises calculating the quantization coefficients in the specified region according to values of the quantization coefficients in the specified region in the quantization coefficient block to obtain the quantization coefficient statistics value,
   wherein the quantization coefficient statistics value is a remainder of the calculated result of the quantization coefficients, and
   wherein it is determined to skip the inverse transform process in the response to determining that the quantization coefficient statistic value belongs to a first value set.

20. A non-transitory computer-readable medium storing a bit stream of a video, wherein the bit stream is decoded according to the decoding method of claim 1.

* * * * *